US005971295A

United States Patent [19]

Jensen et al.

[11] Patent Number: 5,971,295

[45] Date of Patent: Oct. 26, 1999

[54] AGRICULTURAL SPRAYER UNIT AND AN AIR-FLOW GENERATING ASSEMBLY OF AN AGRICULTURAL SPRAYER UNIT

[75] Inventors: Soeren Hartvig Jensen, Fredensborg; Henrik Engqvist, Roskilde, both of Denmark

[73] Assignee: Hardi International A/S, Taastrup, Denmark

[21] Appl. No.: 08/663,188

[22] PCT Filed: Dec. 15, 1994

[86] PCT No.: PCT/DK94/00469

§ 371 Date: Sep. 6, 1996

§ 102(e) Date: Sep. 6, 1996

[87] PCT Pub. No.: WO95/16347

PCT Pub. Date: Jun. 22, 1995

[30] Foreign Application Priority Data

Dec. 17, 1993 [DK] Denmark ................................ 1396/93

[51] Int. Cl.[6] ........................................................ B05B 9/06

[52] U.S. Cl. ............................ 239/77; 239/168; 239/172; 239/600; 239/552; 239/587.5

[58] Field of Search .................................... 239/172, 390, 239/290, 292–296, 156, 77, 78, 163–169, 600, 587.5, 566, 552, 556, 587.1

[56] References Cited

U.S. PATENT DOCUMENTS

| | | | |
|---|---|---|---|
| 927,315 | 7/1909 | Baldwin | 239/164 |
| 1,677,486 | 7/1928 | Nelson | 239/566 X |
| 3,472,454 | 10/1969 | Blue . | |
| 3,666,178 | 5/1972 | Crimmins et al. | 239/77 |
| 3,804,332 | 4/1974 | Welch . | |
| 3,887,129 | 6/1975 | Brown | 239/164 |
| 3,902,667 | 9/1975 | Jackson et al. | 239/167 |
| 4,274,589 | 6/1981 | Jones | 239/172 X |
| 4,446,928 | 5/1984 | McClure et al. | 239/167 X |
| 4,927,080 | 5/1990 | Alsing . | |
| 4,982,898 | 1/1991 | Ballu . | |
| 5,098,018 | 3/1992 | Hadar et al. | 239/167 X |
| 5,176,322 | 1/1993 | Sartor | 239/77 |
| 5,657,928 | 8/1997 | Jian | 239/566 X |

FOREIGN PATENT DOCUMENTS

| | | |
|---|---|---|
| 0 272 740 A1 | 6/1988 | European Pat. Off. . |
| 0 543 217 A1 | 5/1993 | European Pat. Off. . |
| 734 203 | 10/1996 | European Pat. Off. . |
| 685211 | 12/1952 | United Kingdom . |
| WO 88/01539 | 3/1988 | WIPO . |

*Primary Examiner*—Kevin Weldon
*Attorney, Agent, or Firm*—Stephen C. Glazier

[57] ABSTRACT

An agricultural sprayer unit to be moved by a moving vehicle relative to crops to be sprayed with a chemical agent delivered from said agricultural spray unit includes: a frame connectable to said moving vehicle for connecting said agricultural sprayer unit to said moving vehicle for moving along with said moving vehicle, a tank supported by said frame for storing said chemical agent, a boom linked to and extending from said frame defining a specific orientation relative to said crops, a nozzle supported by and positioned along said boom and communicating with said tank for receiving said chemical agent from said tank for generating an atomized jet of said chemical agent to be expelled from said nozzle and sprayed onto said crops, and air-flow generating apparatus supported by said frame and extending along said boom for generating an air flow directed from said air-flow generating apparatus to said crops, said air flow generating apparatus being divided into a number of subsections positioned along said boom, each subsection including a set of individual air outlets for generating a specific air distribution pattern by said individual air outlets relative to said atomized jet of said chemical agent, and said specific air distribution patterns generated by said subsections together defining said air flow directed to crops.

108 Claims, 6 Drawing Sheets

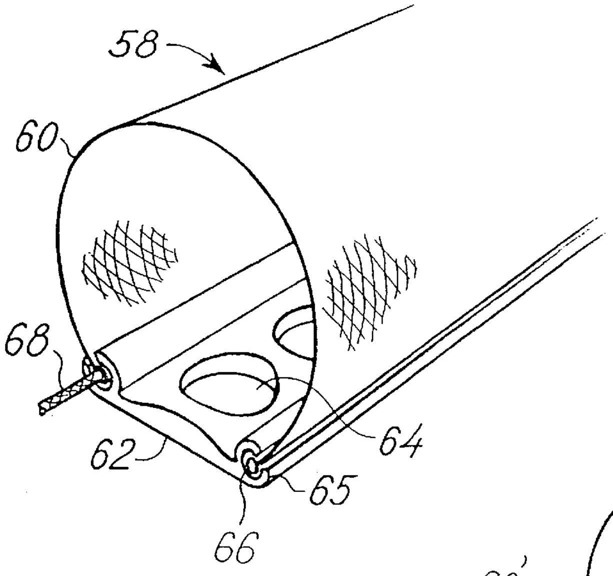
Fig. 2a
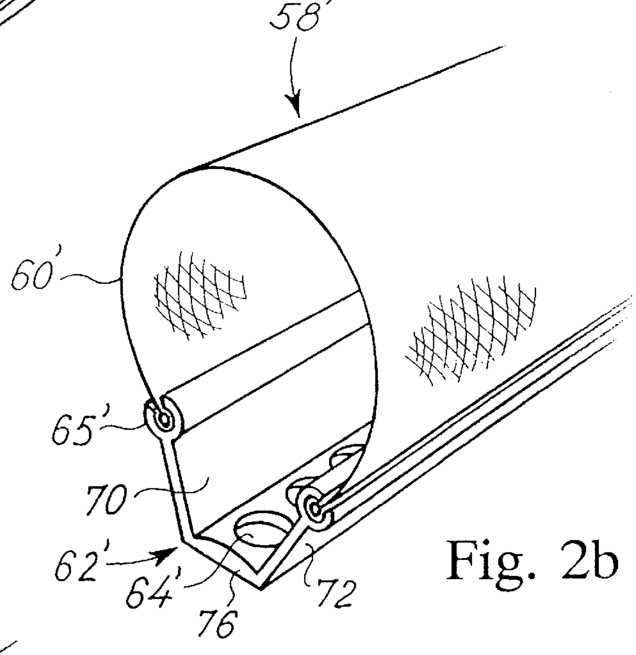
Fig. 2b
Fig. 2c
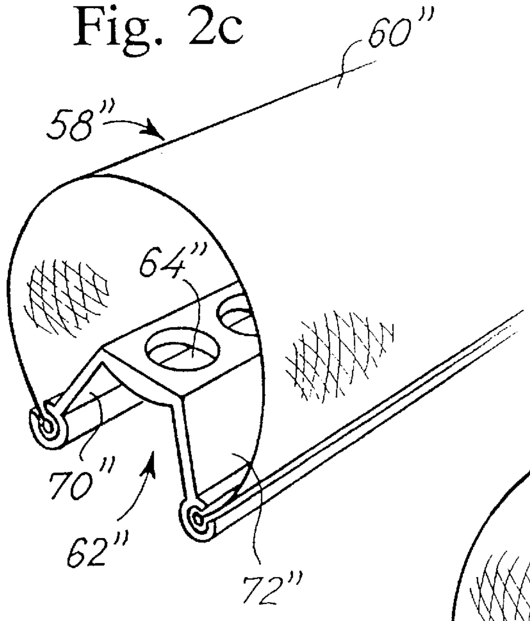
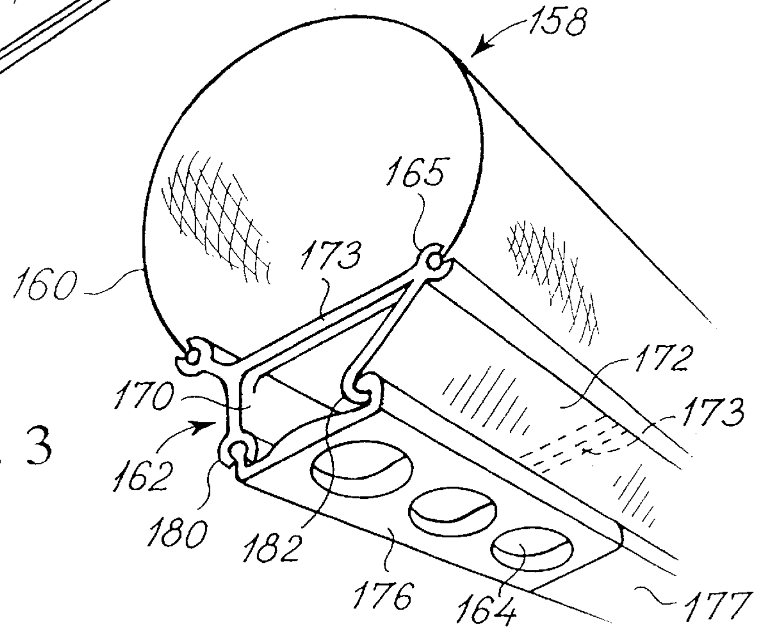
Fig. 3

Fig. 7
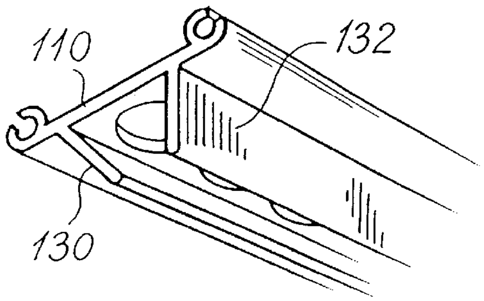
Fig. 8
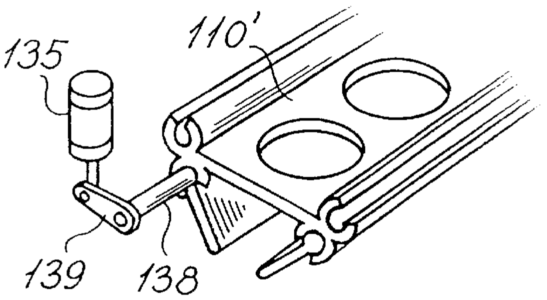
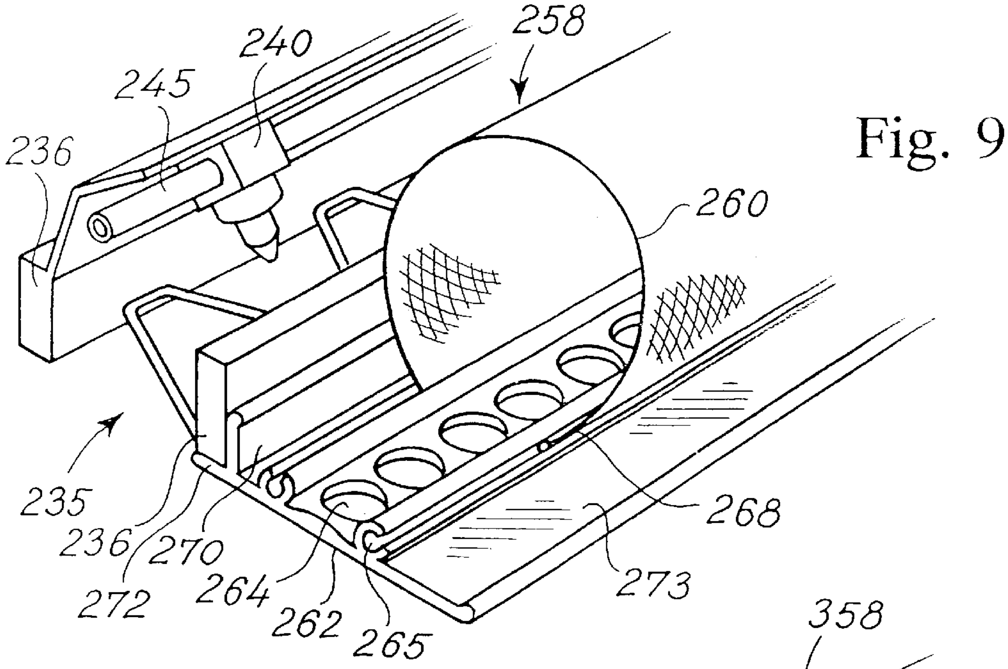
Fig. 9
Fig. 10
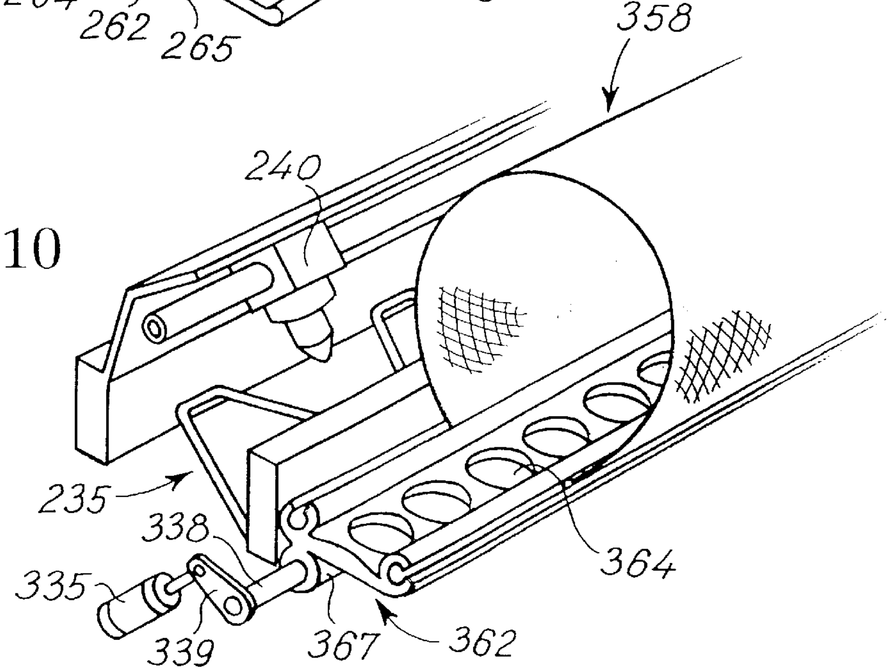

AGRICULTURAL SPRAYER UNIT AND AN AIR-FLOW GENERATING ASSEMBLY OF AN AGRICULTURAL SPRAYER UNIT

This application claims benefit of international application PCT/DK94/00469, filed Dec. 15, 1994.

BACKGROUND OF THE INVENTION

The present invention relates to an agricultural sprayer device particularly useful for the deposition of a chemical agent which is to be distributed on crops.

1. Field of the Invention

When spraying crops with chemical agents such as insecticides, fungicides, and the like, a problem resides in that the plants must be sprinkled on all surfaces as uniformly as possible, and for this reason, the chemical agent is usually atomized. This, however leads to the disadvantage that the wind may interfere whereby the mist is carried away by the wind and deposited in the wrong places. Additionally, many crops grow into an interwoven tangle so that penetration by sprays is virtually impossible. As such, the underside of the crops remain susceptible to desease and the like with only the tops thereof being protected. As a consequence, economic factors as well as considerations regarding the damage to environment due to the excessive use of potentially hazardous spraying agents have promoted the development of more efficient methods and implements for reducing the required dose rates by ensuring a correct deposition of the spraying agent.

Forced air streams have long been known as an invaluable method of constraining, transporting and depositing sprays for crop protection. Machinery developed for air-assisted spraying ranges from small hand-held devices to large, heavy duty equipment on wheels used to spray bush, vine and tree crops, and broadacre ground crops. Early examples of such machinery are disclosed in British patent no. 685,211 and U.S. Pat. No. 3,804,332 none of which gained much popularity due to their heavy-weight boom structure which reduced the maximum possible boom width. The same applies to the sprayer disclosed in U.S. Pat. Nos. 4,274,589 and 3,472,454 which are both cumbersome in use.

In the past decade a number of air-assisted sprayers have been developed, examples of which are described in European patent no. 272,740 (Van den Munckhof), U.S. Pat. No. 5,098,018 (Degania sprayers), Australian patent application no. 14,546/83 (Degania sprayers) and U.S. Pat. No. 4,927,080 (Hartvig Jensen & Co.). These sprayers comprise a spray boom carrying and air blower an an elongated, flexible sheet provided with an air discharge, either as a slit-like outlet or a series of perforations. Nozzles for spraying a spraying agent are situated alongside the air-flow generating means. Moreover, U.S. Pat. No. 4,982,898 discloses an agricultural sprayer having a rigid outer tube with a flexible, internal air duct. Reference is made to the above patents, and the above US patents are hereby incorporated in the present specification by reference.

2. Description of the Related Art

It is an object of the present invention to provide an agricultural spraying system which allows for a greater flexibility and which may be employed in an increased number of applications.

It is a further object of the present invention to provide a spraying system having means for providing a controlled air outflow.

An advantage of the agricultural sprayer system according to the present invention is that the air distribution pattern of the air-flow generating means may be varied in a particularly simple manner, allowing the spraying system to be used for spraying different types of crops and spraying crops under varying nature and weather conditions.

It is a feature of the present invention that an agricultural spraying system is provided rendering it possible, using simple means, to produce an air flow pattern which may be altered while, using the same simple means, allowing a variation of the air flow relative to the crops being sprayed and relative to the ground on which the crops are grown.

According to a first aspect of the present invention, the above object, the above advantage and the above feature, together with numerous other objects, advantages and features which will be evident from the below detailed description of preferred embodiments of the agricultural spraying system according to the present invention, are obtained by means of an agricultural sprayer unit to be moved by means of a moving vehicle relative to crops to be sprayed with a chemical agent delivered from the agricultural sprayer unit and comprising:

frame means connectable to the moving vehicle for connecting the agricultural sprayer unit to the moving vehicle for moving along with the moving vehicle, tank means supported by the frame means for storing the chemical agent, boom means linked to and extending from the frame means defining a specific orientation relative to the crops, nozzle means supported by and positioned along the boom means and communicating with the tank means for receiving the chemical agent from the tank means for generating an automized jet of the chemical agent to be expelled from the nozzle means and sprayed onto the crops, and air-flow generating means supported by the frame and extending along the boom means for generating an air flow directed from the air-flow generating means to the crops, the air-flow generating means being divided into a number of subsections positioned along the boom means, each subsection including a set of individual air outlets for generating a specific distribution pattern by means of the individual air outlets relative to the atomized jet of the chemical agent, and the specific air distribution patterns generated by the subsections together defining the air flow directed to the crops.

The air-flow generating means of the agricultural sprayer unit according to the present invention fulfils the main purpose of generating a specific air distribution pattern by being divided into a number of subsections including respective sets of outlets rendering it possible to convert the sprayer from a specific application into another for providing a uniform air flow taking into consideration the orientation of the boom means relative to the crops, the crops themselves, the nature and also the weather conditions or alternatively providing an air flow of a specific air distribution pattern promoting the deposits of the chemical agent on the crops in question determined by the position, configuration and orientation of the air outlets of the individual subsections of the air-flow generating means. By forming the air-flow generating means with a number of subsections positioned along the boom, the air outflow may be varied by replacing a specific subsection by another thereby providing a desired overall distribution pattern.

In the present context, the expression defining a specific orientation relative to the crops is to be construed a generic term which refers to the various factors which may influence the actual position of the boom means relative to the crops, as in most instances, the boom means is intentionally positioned so as to position the nozzle means supported by and positioned along the boom means in positions relative to the crops ensuring that the atomized jet of the chemical agent generated and expelled from the nozzle means and sprayed onto the crops causes the chemical agent to be deposited uniformly on the crops. Provided the crops are growing on the ground, the boom means is in most instances positioned extending substantially parallelly with the surface of the ground.

In case the surface of the ground is sloping or the crops growing on the ground are not of uniform heigth, an orientation of the boom means relative to the crops differing from the above described conventional position of the boom means in substantially parallel relationship with the surface of the ground may be provided. Also other factors such as the weather conditions, the configuration of the atomized jet of the chemical agent generated by and expelled by the nozzle means may urge the user or farmer to position the boom means in a position differing from the above described usual parallel relationship relative to the surface of the ground.

In order to compensate for all factors influencing the deposition of the chemical agents on the crops in accordance with the actual requirements usually involving a substantially uniform distribution of the chemical agent onto the crops, the air-flow generating means of the agricultural sprayer unit according to the present invention is divided into a number of subsections each generating a specific air distribution pattern together generating the air flow causing the intentional deposition of the chemical agents on the crops. A different application of the agricultural sprayer unit according to the present invention involves the spraying of chemical agents onto crops growing on vertical supports such as grape wine or constituting trees themselves carrying fruits or leaves which are to be sprayed by a chemical agent.

Provided the agricultural sprayer unit according to the present invention is used for spraying a chemical agent onto trees, the boom means is positioned in an orientation differing from the above described parallel relationship relative to the surface of the ground. In most instances, the boom means of the agricultural sprayer unit according to the present invention is positioned in a substantially perpendicular relationship relative to the surface of the ground provided the agricultural sprayer unit is used for spraying a chemical agent onto trees, however, an orientation differing from the perpendicular relationship relative to the surface of the ground may in some instances be employed provided e.g. crowns of trees are to be sprayed by a chemical agent.

For spraying crops positioned in rows or e.g. spraying crowns of trees, the chemical agent expelled by the nozzle means of the agricultural sprayer unit and carried by the air flow generated by the air outlets of the air-flow generating means of the agricultural sprayer unit according to the present invention has to be adapted to the actual application which in some instances involves the generation of an air flow by the air-flow generating means concentrated in certain areas along the boom means corresponding to the regions to be impinged by the atomized jet of the chemical agent whereas other subsections of the air-flow generating means generate no air flow. Consequently, in accordance with a specific embodiment of the agricultural sprayer unit according to the present invention, the air-flow generating means further comprises a specific subsection including no air outlets and generating no air distribution pattern.

The frame means of the agricultural sprayer unit according to the present invention may be implemented in accordance with any specific requirements such as a specific utilization of the agricultural sprayer unit according to the present invention in accordance with a specific moving vehicle as the frame means of the agricultural sprayer unit according to the present invention may be adapted to be connected to and moved by the moving vehicle. In accordance with the presently preferred embodiment of the agricultural sprayer unit according to the present invention, the frame of the agricultural sprayer unit according to the present invention comprises elements for establishing connection to a three-point suspension of the moving vehicle which preferably constitutes an agricultural tractor.

In accordance with an alternative embodiment, the agricultural sprayer unit according to the present invention constitutes a part of a self propelling unit as the frame means of the agricultural sprayer unit is provided with road wheels. Further alternatively, the frame means may be mounted on a movable trailer which comprises means for establishing connecting to a hitch of a moving vehicle which may be constituted by an agricultural tractor. For alternative applications e.g. within the field of horticulture, the agricultural sprayer unit according to the present invention may comprise rail wheel which are rolling on rails as the agricultural sprayer unit is moved across the crops by means of a cable, rope or wire drive.

In accordance with the presently preferred embodiment of the agricultural sprayer unit according to the present invention, the frame means comprises a lift platform which preferably serves the purpose of supporting the boom means allowing the boom means to be shifted from one position to another for altering the orientation of the boom means relative to the crops or alternatively for shifting the boom means from an operational position to a position of rest. Thus, the boom means are preferably rotatably linked to the frame means.

Furthermore, provided the boom means constitutes an elongated boom extending e.g. 10–15 m, or possibly less, from one side of the frame means or both sides of the frame means, the boom means is preferably divided into a plurality of boom sections allowing the boom means to be folded together for reducing the overall dimensions of the agricultural sprayer unit as the agricultural sprayer unit is in a position of rest or moved from one location such as a piece of land to the farm without occupying too much space. For allowing the individual boom sections of the boom means to be folded together, the boom sections are preferably interconnected by means of hinges. Alternatively, the individual boom sections of the boom means may be interconnected by means of locking means such as cooperating catching and locking means allowing the boom section to be easily assembled and disassembled prior to use and after use, respectively.

As stated above, the boom means of the agricultural sprayer unit according to the present invention may be orientated in any appropriate orientation relative to the crops which in most instances involves the positioning of the boom means in a substantially parallel relationship relative to the surface of the ground on which the agricultural sprayer unit is moved by means of the moving device.

The tank means of the agricultural sprayer unit according to the present invention communicates in accordance with the teachings of the present invention with the nozzle means for delivering the chemical agent stored within the tank means to the nozzle means generating the atomized jet of the chemical agent to be sprayed onto the crops. The tank means may constitute a separate container of the agricultural unit or alternatively an attachable or exchangeable container which is received by container fixation means of the frame means of the agricultural sprayer unit for fixating the container relative to the frame means. The transfer of the chemical agent from the tank means of the agricultural sprayer unit according to the present invention may be accomplished through the influence of the gravitational field or alternatively be promoted through the utilization of a pump which constitutes a component of the tank means and which preferably communicates with a tubing for delivering the chemical agent to the nozzle means. The pump may be powered by any appropriate energy source such as an electric motor, a hydraulic or pneumatic motor, or alternatively and preferably be connectable to a power take-off of the moving vehicle which is preferably constituted by an agricultural tractor.

The nozzle means generating the atomized jet may be adapted to generate a specific distribution of the atomized chemical agent which distribution is further influenced by the air flow generated by the air outlets of the subsections of the air-flow generating means of the agricultural sprayer unit according to the present invention accomplishing in accordance with the teachings of the present invention a specific intentional deposition of the chemical agent on the crops. It is to be understood that the actual pattern of the atomized jet of the chemical agent generated by the nozzle means together with the orientation of the boom means of the agricultural sprayer unit, and also the above described factors such as the nature and weather conditions along with the actual configuration, orientation and distribution of the individual air outlets of the subsections of the air-flow generating means contribute to the overall deposition of the chemical agent on the crops. In most instances, the nozzle means of the agricultural sprayer unit according to the present invention generate the atomized jet as a flat fan constituting a predetermined pattern which together with the above factors and also the orientation of the boom and the distribution, orientation and configuration of the air outlets of the subsections of the air-flow generating means produce an intentional deposition of the chemical agent on the crops.

In the presently preferred embodiment of the agricultural sprayer unit according to the present invention, the nozzle means comprise individual nozzles positioned along the boom means at a spacing of 0.25 m–1,25 m, preferably approx. 0.5 m. Alternatively, the nozzle means may be constituted by alternative means for generating the atomized jet of the chemical agent of different configuration or physical shape fulfilling the purpose of providing a predetermined pattern of the atomized jet of the chemical agent.

In order to allow the pattern of the atomised jet generated by the nozzle means of the agricultural sprayer unit according to the present invention to be altered in accordance with specific requirements, the individual nozzles are preferably rotatably supported for rotation about a longitudinal axis of the boom means.

In the above described presently preferred embodiment of the agricultural sprayer unit according to the present invention comprising a lift platform constituting a part of the frame means of the agricultural sprayer unit, the air-flow generating means characteristic of the present invention are preferably also supported by the lift platform allowing the air-flow generating means to be lifted by the lift platform together with the boom means.

The air-flow generating means may in accordance with the basic realization of dividing the air-flow generating means into subsections in accordance with the teachings of the present invention be constituted by any appropriate means such as individual air blowers, e.g. air blowers arranged along the boom means and constituting respective components of the subsections of the air-flow generating means. According to the presently preferred embodiment of the agricultural sprayer unit according to the present invention, the air-flow generating means comprise an air blower and an air duct extending along the boom means, i.e. comprise components to a great extent similar to the components of the air assisted sprayer described in U.S. Pat. No. 4,927,080 (Hartvig Jensen & Co.).

As described above, the boom means of the agricultural sprayer unit according to the present invention preferably comprises a plurality of boom sections, and similarly, the air duct of the presently preferred embodiment of the agricultural sprayer unit according to the present invention comprising an air blower and an air duct is preferably also divided into sections corresponding to the boom sections. In a particular advantageous embodiment of the agricultural sprayer unit according to the present invention in which the boom means are divided into a plurality of boom sections and in which the air duct is also divided into sections corresponding to the boom sections, each subsection of the air-flow generating means preferably defines a length corresponding to the length of a respective boom section.

In a particular embodiment of the agricutural sprayer unit according to the present invention in which the air-flow generating means is adapted to generate a substantially uniform air flow to the crops, the individual air distribution patterns of the individual subsections of the air-flow generating means are also identical. Consequently, the individual air outlets of the subsections of the air-flow generating means may have identical configuration providing a uniform air flow directed to the crops from the air-flow generating means.

In the above described presently preferred embodiment of the agricultural sprayer unit according to the present invention comprising an air blower and an air duct, the air duct is preferably inflatable and comprises an elongated, flexible and air-impervious sheet having longitudinally extending edges. The edges may advantageously be secured in spaced-apart relationship and extend along the boom means as the inflatable duct may comprise elongated connecting elements extending along the edges of the air-impervious sheet, which longitudinally extending edges are fastened to and interconnected by the elongated connecting elements which define the subsection. In the above described advantageous embodiment of the agricultural sprayer unit according to the present invention, the individual subsections of the air-flow generating means are constituted by the connecting element which further serve the purpose of securing the edges of the air duct in space-apart relationship and consequently of supporting and fixating the air duct in its intentional configuation.

Alternatively, in the above described presently preferred embodiment of the agricultural sprayer unit according to the present invention comprising an air blower and an air duct, the air duct is preferably inflatable and comprises an elongated, flexible and air-impervious sheet having longitudinally extending edges. The edges may advantageously be secured in spaced-apart relationship and extend along the boom means as the inflatable duct may comprise elongated connecting elements extending along the edges of the air-impervious sheet, which longitudinally extending edges are fastened to and interconnected by the elongated connecting elements which comprises separate air outlet elements defining the subsections and being releasably connected to said elongated connecting elements. In the above described advantageous embodiment of the agricultural sprayer unit according to the present invention, the individual subsections of the air-flow generating means are constituted by the air outlet element which are releasably connected to the elongated connecting elements which serve the purpose of securing the edges of the air duct in space-apart relationship and consequently of supporting and fixating the air duct in its intentional configuation.

The air-flow generating means of the agricultural sprayer unit according to the present invention may apart from being supported by and extending along the boom means be fixated to the boom means in any appropriate manner. Provided the subsections of the air-flow generating means are defined by the connecting elements of the above described presently preferred embodiment, the elongated connecting elements may preferably constitute elements also serving the purpose of fixating and connecting the air-flow generating means to the boom means as the elongated connected elements are connected to the boom means. The elongated connecting elements may be connected to the boom means in any appropriate manner as the elongated connecting elements may e.g. be fixated relative to the boom means by means of e.g. bolts or through welded joints or alternatively, the elongated connecting elements may be rotatably joined to the booms allowing the air-flow generating means to be shifted through rotation relative to the boom means for altering the direction of the air distribution patterns generated by the individual air outlets of the subsections of the air-flow generating means in relation to the orientation of the boom means.

The elongated connecting elements may advantageously secure the longitudinally extending edges of the air impervious sheet in the above described space-apart relationship. The maintenance of the longitudinally extending edges of the air-impervious sheet of the air duct in the spaced-apart relationship may advantageously be established by means of separate fastening means constituting components of the elongated connecting elements or alternatively constituting elements of the impervious sheet and arranged along the longitudinally extending edges. Provided the elongated connecting elements as well as the air-impervious sheet are provided with fastening means, the fastening means of the sheet and the fastening means of the elongated connecting elements are preferably complementary fastening elements serving the purpose of cooperating for fixating the air-impervious sheet relative to the elongated connecting elements.

The longitudinally extending edges of the air-impervous sheet may be permanently fixated to the connecting elements constituting integral components or alternatively be releasably fastened to the connecting elements.

For providing a continuous air-flow generating means, the elongated connecting elements defining the individual subsections of the air-flow generating means of the agricultural sprayer unit according to the present invention are preferably arranged end-to-end.

The above object, the above advantage and the above feature together with numerous other objects, advantages and features which will be evident from the below detailed description of preferred embodiments of the agricultural spraying system according to the present invention are obtained by means of an air-flow generating assembly according to the present invention constituting an element of an agricultural sprayer unit to be moved by means of an air-flow generating assembly of an agricultural sprayer unit to be moved by means of a moving vehicle relative to crops to be sprayed with a chemical agent delivered from the agricultural sprayer unit, the agricultural sprayer unit comprising:

frame means connectable to the moving vehicle for connecting the agricultural sprayer unit to the moving vehicle for moving along with the moving vehicle, tank means supported by the frame means for storing the chemical agent, boom means linked to and extending from the frame means defining a specific orientation relative to the crops, and nozzle means supported by and positioned along the boom means and communicating with the tank means for receiving the chemical agent from the tank means for generating an automized jet of the chemical agent to be expelled from the nozzle means and sprayed onto the crops, the air-flow generating assembly being supported by the frame and extending along the boom means for generating an air flow directed from the air-flow generating means to the crops, the air-flow generating assembly being divided into a number of subsections positioned along the boom means, each subsection including a set of individual air outlets for generating a specific air distribution pattern by means of the individual air outlets relative to the atomized jet of the chemical agent, and the specific air distribution patterns generated by the subsections together defining the air flow directed to the crops.

According to a second aspect of the present invention, the above object, the above advantage and the above feature, together with numerous other objects, advantages and features which will be evident from the below detailed description of preferred embodiments of the agricultural spraying system according to the present invention, are obtained by means of an agricultural sprayer unit to be moved by means of a moving vehicle relative to crops to be sprayed with a chemical agent delivered from said agricultural sprayer unit comprises:

frame means connectable to said moving vehicle for connecting said agricultural sprayer unit to said moving vehicle for moving along with said moving vehicle, tank means supported by said frame means for storing said chemical agent, boom means linked to and extending from said frame means defining a specific orientation relative to said crops, nozzle means supported by and positioned along said boom means and communicating with said tank means for receiving said chemical agent from said tank means for generating an automized jet of said chemical agent to be expelled from said nozzle means and sprayed onto said crops, and air-flow generating means supported by said frame and comprising an air-blower and an air duct extending along said boom means for generating an air flow directed from said air-flow generating means to said crops, said air duct being inflatable and comprising an elongated, flexible and air-impervious sheet having longitudinally extending edges, said edges being secured in spaced-apart relationship and extending along said boom means, said inflatable duct comprising elongated connecting elements extending along said edges of said air-impervious sheet, and said longitudinally extending edges being fastened to and interconnected by said elongated connecting elements.

According to a third aspect of the present invention, the above object, the above advantage and the above feature, together with numerous other objects, advantages and features which will be evident from the below detailed description of preferred embodiments of the agricultural spraying system according to the present invention, are obtained by means of an agricultural sprayer unit to be moved by means of a moving vehicle relative to crops to be sprayed with a chemical agent delivered from said agricultural sprayer unit, comprises:

frame means connectable to said moving vehicle for connecting said agricultural sprayer unit to said moving vehicle for moving along with said moving vehicle, tank means supported by said frame means for storing said chemical agent, boom means linked to and extending from said frame means defining a specific orientation relative to said crops, nozzle means supported by and positioned along said boom means and communicating with said tank means for receiving said chemical agent from said tank means for generating an automized jet of said chemical agent to be expelled from said nozzle means and sprayed onto said crops, and, air-flow generating means supported by said frame and comprising an air-blower and an air duct extending along said boom means for generating an air flow directed from said air-flow generating means to said crops, said air duct being inflatable and comprising an elongated, flexible and air-impervious sheet having longitudinally extending edges, said edges being secured in spaced-apart relationship and extending along said boom means, said inflatable duct comprising elongated connecting elements extending along said edges of said air-impervious sheet, said longitudinally extending edges being fastened to and interconnected by said elongated connecting elements, and said elongated connecting elements comprising separate, releasable air outlet elements.

The air-flow generating assembly according to the present invention may adtageously comprise any of the features of the above described alternative embodiments of the agricultural sprayer according to the present invention.

BRIEF DESCRIPTION OF THE DRAWINGS

FIGS. 2*a*–2*c* are perspecitive, schematic and sectional views of three alternative embodiments of an inflatable duct of the agricultural sprayer apparatus according to the present invention;

FIG. 3 is a perspective, schematic and sectional view similar to the views of FIGS. 2*a*–2*c* of a fourth embodiment of the inflatable duct of the agriculture sprayer apparatus according to the present invention;

FIG. 7 is a perspective, schematic and sectional view similar to the views of FIGS. 4*a*–4*c* of a further embodiment of the profiled element of the inflatable duct of the agriculture sprayer apparatus according to the present invention;

FIG. 8 is a perspective, schematic and sectional view similar to the view of FIG. 7 further disclosing a motor for rotating the profiled element;

FIG. 9 is a perspective, schematic and sectional view of an assembly including the inflatable duct of the agriculture sprayer device according the the present invention including a further embodiment of the profiled element and also including elements of a boom structure of the agriculture sprayer apparatus;

FIG. 10 is a perspective, schematic and sectional view similar to the view of FIG. 9 further illustrating a motor for rotating the inflatable duct of the agriculture sprayer apparatus relative to the boom structure;

DETAILED DESCRIPTION OF THE PREFERRED EMBODIMENTS

Figure 1A:
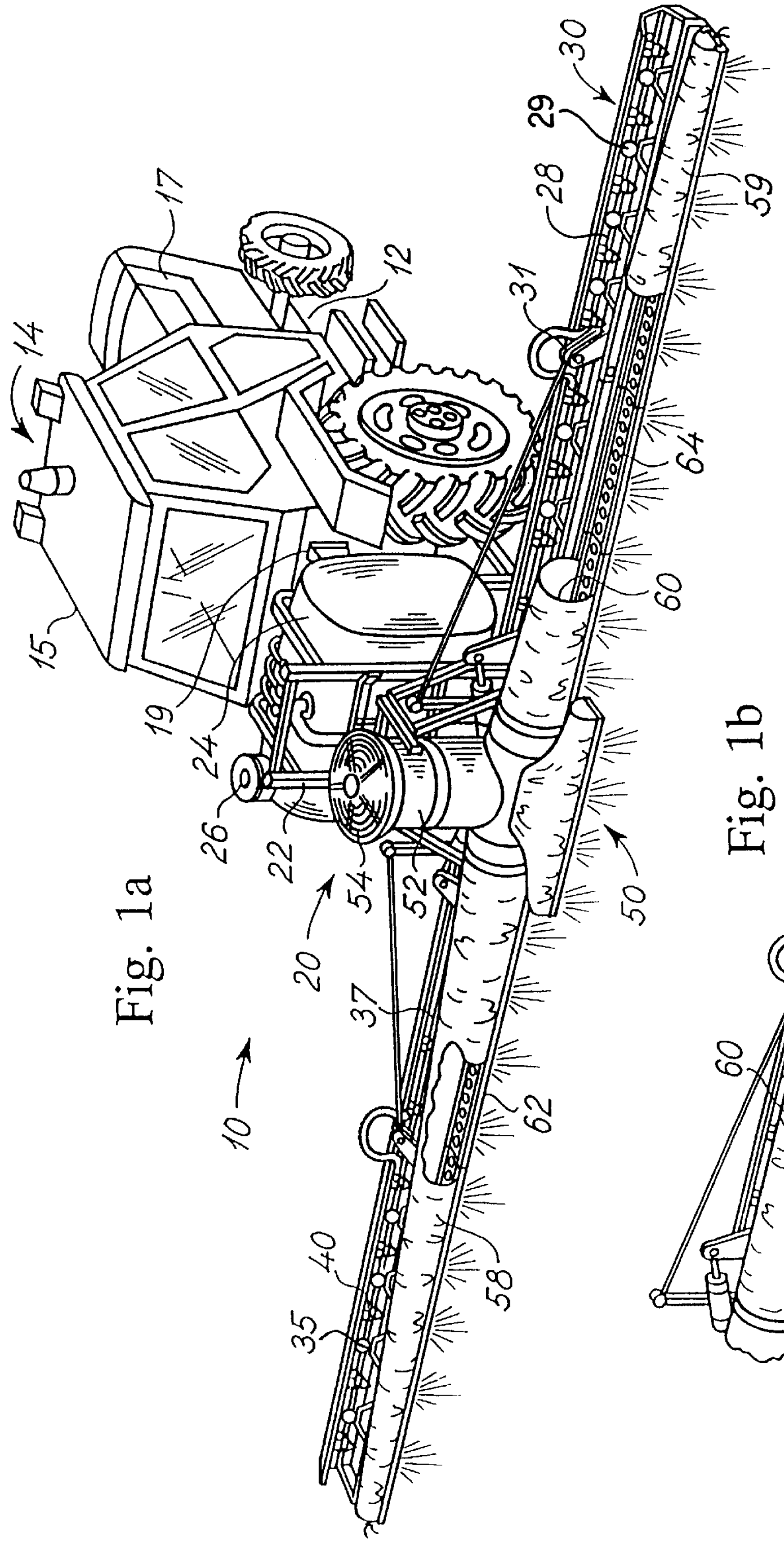
FIG. 1*a* is a perspective and schematic view of a farm tractor to which an agriculture sprayer apparatus is mounted which apparatus is implemented in according with the teachings of the present invention.

In FIG. 1*a*, a first embodiment of an agricultural sprayer apparatus according to the present invention is shown generally designated the reference numeral 10. The agricultural sprayer apparatus 10 comprises a agricultural tractor 14 and a spraying unit 20. The agricultural tractor 14 comprises a chassis 12, a driver's cab 15 and an engine 17. At the rear part, the tractor 14 is provided with a connecting device 19, such as an ordinary three-point coupling for establishing connection to auxiliary equipment such as an agricultural implement. Alternatively, the connecting device 19 may be a hitch for connecting thereto a separate trailer (not shown). The tractor 14 is further provided with a power take-off (not shown) at the rear part.

The spraying unit 20 generally comprises a frame 22 for supporting a container or tank 24 containing a fluent material, such as a chemical agent, i.e. a pesticide or a fungicide to be deposited on vegetation by spraying. The tank 24 is provided with an inlet aperture 26 for filling the tank with the chemical agent. The frame 22 is further provided with a pump unit (not shown) connected to the power take-off of the tractor, or to any other suitable power means, for transferring the chemical agent from the tank 24 to a plurality of nozzles from which the chemical agent is sprayed onto the crop, as will be explained in further details below. The spraying unit 20 is shown as being connected to the tractor by means of the above mentioned three-point coupling. The spraying unit may, however, be mounted on a separate trailer which is subesquently connected to the tractor 14.

The frame 22 furthermore supports a boom structure 30 which extends in a transverse direction in relation to the agricultural tractor 14 and is formed as a plane lattice structure. The boom structure 30 is preferably composed of a number of individual boom structure sections 35, 37 e.g. four, six or even more boom structure sections. In the presently preferred embodiment shown in FIG. 1, a total of four boom structure sections are provided. The boom structure sections 35, 37 are interconnected by means of hinges 31, allowing the boom structure 30 to be folded to a position (not shown), in which the individual boom structure sections 35, 37 are folded against one another and assume a vertical position, serving the purpose of allowing the agriculural sprayer apparatus 10 to travel from one place to another for moving the spraying unit 20 from one place to another.

In FIG. 1*a*, the boom structure 30 is shown in a position wherein the boom structure sections 35, 37 extend in a plane parallel to the ground. Alternatively, one or more boom structure sections may be raised so as to extend at an angle to the ground for the purpose of spraying special crops such as trees.

Moreover, the boom structure 30 supports a plurality of nozzles 40 arranged along the length of the boom structure 30 for distributing the chemical agent transferred thereto from the tank means 24 by means of the pump, via a tubing 28, likewise supported by the boom structure 30 onto the crop by spraying. Optionally, a plurality of individual air-blowers or fans 29, may be arranged along the length of the boom structure 30.

An air-distributing device is connected to and supported by the frame and is generally designated by the reference numeral 50. The air distributing device 50 comprises an air-blower unit 52 having an air intake 54 and including a fan for providing a pressure and/or high velocity flow of air. The air-blower unit 52 is preferably connected to a power take-off of the tractor 14. The air-distribution device 50 further comprises two elongated air ducts 58, 59 connected thereto, each extending laterally from the air-blower unit 52 at opposite sides thereof along the boom structure 30. The air ducts 58, 59 are releasably connected to the air-blower unit 52 in an air-tight manner whereby the aforementioned pressure and/or high-velocity flow of air may be guided from the air-blower unit 52 of the air-distributing device 50 and into each of the two air ducts 58, 59. As will be apparent, the nozzles are arranged laterally off-set from the air-duct, i.e. behind the air duct as seen in FIG. 1.

The air ducts 58, 59 extending along the boom structure 30 may be connected to the boom structure in numerous ways, as will be discussed in further details below, and is sectionally divided corresponding to the sections 35, 37 of the boom structure 30. As will be apparent, the air ducts 58, 59 each comprises a flexible sheet 60 providing a light-weight structure, and a connecting element 62, whereby in use, i.e. when the air-blower unit 52 of the air-distributing device 50 is activated, the air duct is inflated, thus assuming the configuration shown in FIG. 1, in which the air ducts 58, 59 each assumes a substantially tubular configuration. The air ducts 58, 59 are further provided with individual air-outlets 64 on the lower side thereof and formed in the connecting element 62, and arranged along the air duct and serving the purpose of directing the air flow generated by the air-blower unit 52 towards the crop to be sprayed. As shown, the air duct gradually tapers toward the outer ends of the boom for providing a uniform air flow or an air flow providing a specific distribution pattern predominantly determined by the position, configuration and orientation of the air outlets 64. This, however, is not particularly required as the specific distribution pattern may solely be regulated by the position, configuration and orientation of the air outlets.

During operation, the spraying unit 20 is connected to the tractor 14 by means of the connecting device 19, and the pump unit and the air-blower unit 52 is connected to any power take-off, e.g. of the tractor, and the agricultural sprayer apparatus 10 travels across a field of vegetation or crops to be sprayed, e.g. wheat, barley or corn, the pump delivering the chemical agent contained in the tank 24 via tubes 28 to the nozzles 40 arranged along the boom structure 30. At the same time, the air-blower unit 52 of the air-distribution device 50 generates the above mentioned air flow which is conveyed from the air-blower unit 52 along the air duct 58, 59, leaves the air duct through the air outlets 64 and is directed downwardly to impinge on the jet of spraying agent which leaves the nozzles 40 and is directed towards the vegetation at an angle determined by the position of the nozzles 40 relative to the crop. The impingement depends on the position, configuration and orientation of the air outlets 40 relative to the nozzles 64, which may be varied as discussed below.

In FIG. 2*a*, a first embodiment of the air duct 58 of the air distribution device 50 according to the invention is shown, illustrated in an inflated condition, the duct 58 being pressurized by means of the air blower unit 52. As shown, the air duct 58 comprises the flexible and elongated sheet 60 made of an air-impervious material such as polyester, PVC or polyethylene. The sheet 60 and the connecting element 62 which is of a substantially flat or planar elongated configuration extends along the length of the air duct 58. The connecting element 62 may suitably be manufactured by extrusion of a plastics material or aluminium, and is provided with two grooves or tracks 65 extending along the longitudinal edges of the conneting element 62. The sheet 60 is provided with beads 66 extending along the longitudinal edges of the sheet 60, and the beads 66 are received within and releasably secured to a respective groove or track 65 of the extruded element 62. The width of the sheet 60 is adapted in such a manner to the width of the connecting element 62 that the sheet 60 forms a substantial part of the perimeter of the air duct 58 when secured to the connecting element 62. The beads 66 are preferably formed by folding back a narrow strip of the sheet 60 along the edges thereof to form a channel receiving a wire, rope or a rod-like component 68, which is subsequently forced into the groove 65 of the connecting element 62, thus securing the sheet 60 in fixed relationship to the connecting element 62. The connecting element 62 is as discussed above provided with a plurality of air outlets 64 which are arranged spaced apart along the length of the connecting element 62. According to the invention, connecting elements 62 of different length or configurations, or having air outlets 64 of different sizes and shapes may be arranged end-to-end along the boom structure 30 shown in FIG. 1 supporting the air ducts 58, 59.

The connecting element 62 thus serves the purpose of ensuring the integrity of the air duct 58, while at the same time providing a great flexibility by being releasably connected to the sheet 60, so as to allow the replacement of one element by another, whereby the intensity and direction of the air outflow expelled from the air duct 58 may be ajusted in a particularly simple manner along the air duct 58 in accordance with the intentional intensity and direction of the air flow to be expelled by the air duct 58. The connecting element 62 is preferably connected to the boom structure 30, possibly by means of an adjusting device whereby the direction of the air flowing from the air outlets may be altered relative to the crop being sprayed or relative to the boom structure 30.

Figure 1B:
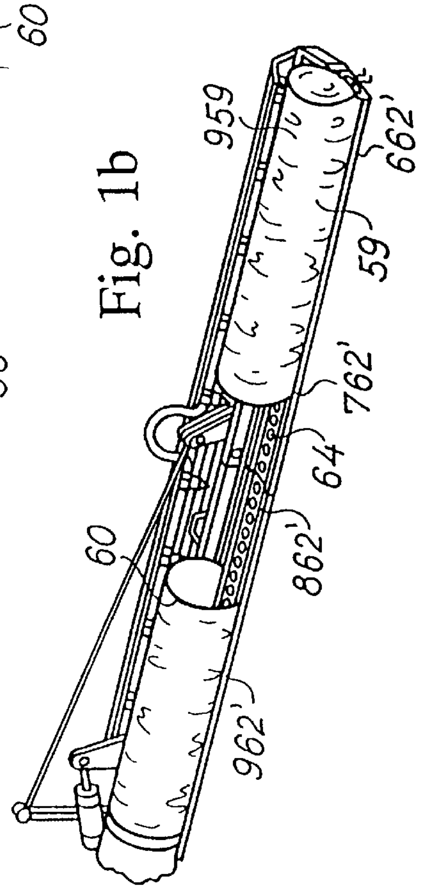
FIG. 1*b* is a perspective and schematic view of an inflatable duct of the agricultural sprayer apparatus acording to the invention.

FIG. 1*b* shows by way of example an air duct 959 comprising four individual connecting elements 662', 762', 862', 962' of a length corresponding to one fourth of the length of the boom structure shown on the right hand side of FIG. 1*a*. The connecting elements 662', 762', 862', 962' are arranged in an end-to-end relationship as described above and provided with a different set or configuration of air outlets 64 for providing or allowing for a variation of the intensity and direction of the air flow which is expelled from the air duct 959. The air duct is formed having a substantially uniform or constant cross section along the length of the air duct 959.

In FIG. 2*b* an alternative embodiment of the air duct 58 is shown. In FIG. 2*b*, elements or components similar to elements or components described above with reference to FIGS. 1 and 2*a* or serving the same purpose as elements or components described above with reference to FIGS. 1 and 2*a* are designated the same reference numerals, however, added the additional marking '. The elongated, U-shaped connecting element 62' of FIG. 2*b* basically consists of inclined flange sections 70, 72 converging towards a web 76. The flange sections 70, 72 are each provided with the tracks 65' extending longitudinally along the free edges. The web 76 is provided with the air outlet apertures 64', as the inclined flanges 70, 72 serve the purpose of directing the air towards the outlets. In use, the connecting element 62' is connected to the sheet 60' by means of the tracks 65', the tracks 65' pointing upwards, thus forming an air duct having a large cross-sectional area.

The sheet 60' need not be provided with parallelly extending, longitudinal edges, but may be formed having a width at one end which is substantially smaller than the width at the opposite end of the sheet 60'. When a sheet 60', formed in this way, is secured to an air-outlet element 62', having substantially parallel tracks 65', the resulting duct 60' exhibits a narrowing or tapering configuration towards one end, as shown in FIG. 1.

FIG. 2*c* shows a further embodiment of the air duct 58. In FIG. 2*c*, elements or components similar to elements or components described above with reference to FIGS. 1, 2*a* or 2*b* serving the same purpose as elements or components described above with reference to FIGS. 1, 2*a* and 2*b* are designated the same reference numerals, however, added the additional marking ". The U-shaped connecting element 62" is as compared to the U-shaped connecting element 62' described above with reference to FIG. 2*b* connected to the sheet 60" in an inverted relationship, thus forming an extremely compact air duct, the interior surfaces of the flanges 70", 72" of the inverted U serving to guide the air leaving the air duct 58" through the apertures 64" in a predetermined direction.

Although the connecting elements 60', 60" of FIG. 2*b* and 2*c*, respectively, are shown as having a generally U-shaped configuration, other configurations such as a V-shape configuration may be envisaged, the apertures being provided on one leg or both legs of the V. Likewise, the connecting element may be formed having a generally curved section, the air outlets being arranged at predetermined locations for providing a directionally controlled air out-flow.

In FIG. 3 a further alternative embodiment of the air duct 58 is illustrated. The air duct 158 shown in FIG. 3 differs from the above described embodiments shown in FIGS. 2*a*, 2*b* and 2*c* in that the sheet 160 of the air duct 158 shown in FIG. 3 is connected to a connecting element 162 which constitutes a composite structure as compared to the connecting elements 62, 62', 62" shown in FIGS. 2*a*, 2*b* and 2*c*, respectively. In FIG. 3, elements or components similar to or serving the same purpose as elements or components described above with reference to FIGS. 1, 2*a*, 2*b* and 2*c* are designated the same reference numeral, however added the prefix 1. The connecting element 162 comprises elongated flanges or side elements 170, 172 joined by means of narrow connecting pieces 173 extending at an angle relative to the longitudinal axis of the air duct and spaced apart along the axis. As shown, the connecting element 162 is provided with channels or grooves 165 extending long the edges of the side elements 170, 172. The connecting element 162 is preferably formed as an integrally cast structure having sufficient strength to support the sheet 160. The side elements 170, 172 of the connecting element 162 are further provided with locking means 180, 182 adapted to releasably secure thereto a separate air-outlet element 176 to the side elements 170, 172, which air-outlet element are provided with apertures 164. The separate air-outlet element 176 serves the purpose of providing a desired outflow of the air expelled from the air duct 158.

As shown, the separate air-outlet element 176 is formed as a substantially planar or flat elongated component having edges formed to engage the locking means 180, 182 of the side elements 170, 172 in a releasable manner. The separate air-outlet element 176 may provide a further strengthening or reinforcing of the connecting element 162 when the air duct is subjected to forces due to the pressure of the air flowing through the air duct 158 or when the agricultural sprayer apparatus 10 moves across a bumpy piece of land.

The connecting element 162 may be provided with a number of separate air-outlet elements 176, 177 arranged end-to-end along the air duct 58, the air outlet element 177 being formed without air outlets, thus forming a blind of particular use when spraying row crops, i.e. to be secured to the connecting element 162 i areas where no outward airstream is desired. In this case, the connection between the connecting element 162 and the sheet 160 may be permanent.

Figure 4A:
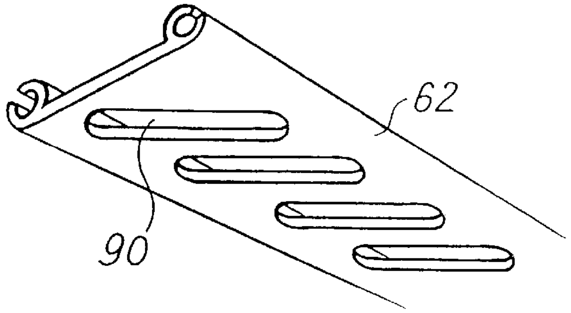
FIGS. 4*a*–4*c* are perspective, schematic and sectional views of alternative embodiments of a profiled element of the inflatable duct shown in FIG. 2*a;*
Figure 4B:
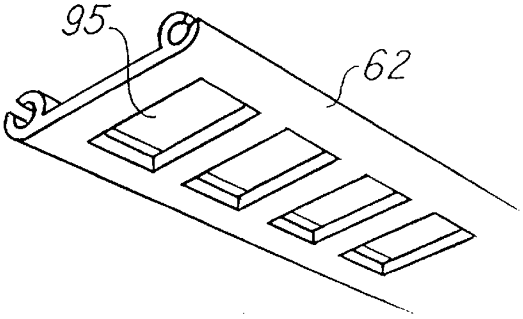
Figure 4C:
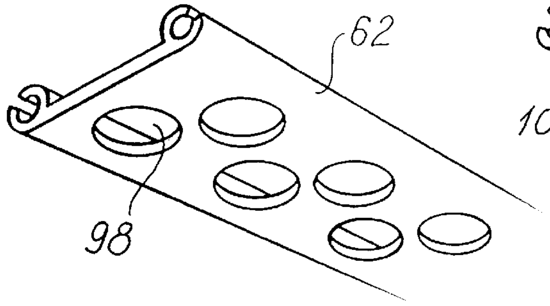

FIGS. 4*a*–4*c* show different configurations or embodiments of the connecting elements 62 of FIG. 2*a* and having any convenient length, e.g. 0.1–8 m, preferably 0.5–2 m and provided with air-outlets arranged according to different configurations, e.g. elongated perforations 90 extending at an angle to the main axis of the air duct, as shown in FIG. 4*a*, or as rectangular openings 95, as shown in FIG. 4*b*. The air outlets may alternatively be formed as circular apertures 98 arranged in two rows extending along the length of the duct, but displaced in relation to one another, as shown in FIG. 4*c*. Furthermore, connecting elements 62 having no air outlets may be provided for use when no air outflow is desired, e.g. when spraying row crops. The configuration of the air-outlets illustrated in FIGS. 4*a*–4*c* may also be employed in connection with any other connecting elements described herein.

Figure 5:
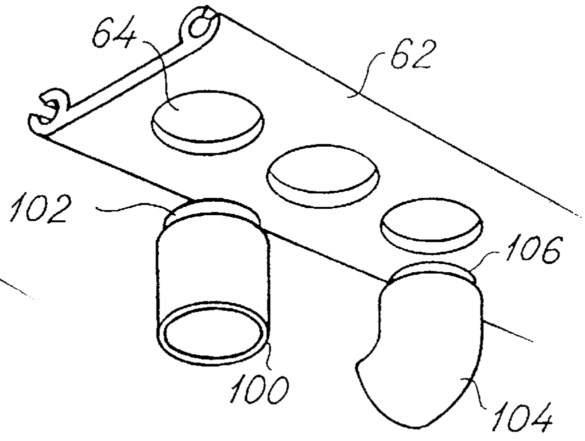
FIGS. 5 and 6 are perspective, schematic and sectional views of alternative configurations of separate nozzle elements to be arranged in connection with the profiled element shown in FIG. 2*a* of the inflatable duct of the agriculture sprayer apparatus according to the present invention.
Figure 6:
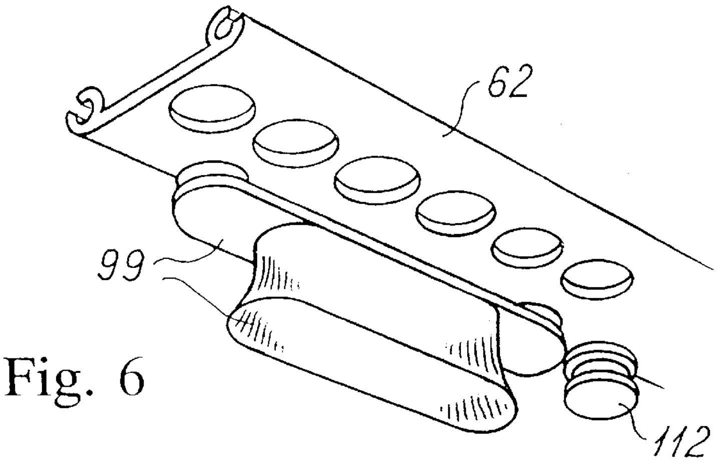

The air-outlets of the connecting element 62 may further be provided with separate nozzle-like elements for directing the air stream in a specific and angular relationship in relation to the ground. In FIG. 5, a tubular nozzle element 100 and an angular nozzle element 104 are shown which are provided with flanges 102 and 106, respectively, to be inserted through the apertures 64 and secured thereto by snap-like engagement. FIG. 6 shows a further embodiment, in which an elongated nozzle element 99 is secured to the connecting element 62 and in which a tapering nozzle element 112 is also secured to the connecting element 62.

In FIG. 7 an alternative further embodiment of a connecting element 110 is shown which is formed as the connecting element 62 described above with reference to FIG. 2*a*, but further provided with integrally formed, downwardly extending flanges or side plates 130, 132 for directing the flow of air in a predetermined direction and orientation.

FIG. 8 shows a connecting element 110' similar to the connecting element 110 of FIG. 7. The connecting element 110' differs from the connecting element 110 of FIG. 7 in that the connecting element 100' is connected to an actuator 135, such as a motor or a hydraulic or electric cylinder through a shaft 138 and a crank arm 139. The shaft 138 is connected to the connecting element 110' for allowing the connecting element 110' and the sheet 60 of the air duct assembly to be pivoted round the shaft 138 for pivoting or turning the connecting element 110' relative to the supporting boom structure such as the boom structure 30 shown in FIG. 1. Like the connecting element 110' shown in FIG. 8, any of the described embodiments of the connecting element and also the air duct may be provided with pivoting means for pivoting the air duct relative to the supporting boom structure. Alternatively, the boom structure such as the boom structure 30 described above with reference to FIG. 1 may in its entirety including the air duct 58 and 59 be pivoted relative to the air-blowing unit 52. Alternatively, one or both side plates 130, 132 of FIGS. 7 and 8 may be rotatably connected to the connecting element, the actuator 135 serving to produce a rotation of the side plates 130, 132 relative to the connecting element thus varying the velocity of the air stream.

In FIG. 9 a further embodiment 258 of the air duct is shown. The air duct 258 is secured to a boom section 235 and comprises a connecting element 262 which has air outlets 264 and is connected to a flexible sheet 260 by means of a bead 268 inserted into grooves 265 of the connecting element 262. The connecting element 262 is basically a substantially flat, planar extruded component as described with reference to FIG. 2*a* and comprises a flange 270 extending perpendicularly thereto along the length of the connecting element 262 together with a first tongue 272 formed as an extension of the connecting component, extending beyond the flange 270 alongside the connecting element 262. The connecting element 262 is furthermore provided with a second tongue 273 serving the purpose of supporting the sheet 260 when the duct is deflated.

As shown, the boom section 235 comprises a framework formed from tubes or elements 236 extending parallel to one another and serving two purposes, viz. firstly the purpose of supporting a series of nozzles 240 and tubings 245 for distributing the chemical agent contained in the tank 24 and secondly the purpose of supporting the air duct 258 comprising the sheet 260 and the connecting element 262. The elements 236 are of rectangular cross section, allowing the flange 270 and the tongue 272 to rest against two sides of the elements in supported relationship. The air duct 258 is fixated in relation to the boom section 235 by means of fixation means (not shown) possibly by securing the connecting element 262 directly to a tube 236. The direction of the air flowing from the air duct 258 through the air outlets 264 may be varied in relation to the crop by rotating the entire boom section about its longitudinal axis.

FIG. 10 shows an alternative embodiment 358 of the air duct according to the present invention. In FIG. 10, elements or components similar to or fulfilling the same purpose as elements or components described above with reference to FIGS. 1, 2*a*, 2*b* and 2*c* are designated the same reference numerals, however with the prefix 3 added. Thus, the air duct 358 comprises a connecting element 362 similar to the connecting element 62 described above with reference to FIG. 2*a*. The connecting 362 is, however, provided with a downwardly protruding channel-like section 367 receiving a shaft 338 which is connected to a crank arm 339 and further to an actuator 335, such as a motor or a hydraulic or electric cylinder, serving the same purpose as the actuator 135 described above with reference to FIG. 8. The air duct 358 shown in FIG. 10 is further connected to the boom section 235 described above with reference to FIG. 9 by means of suitable bearings. The actuator 335 serves the purpose of rotating the connecting element 362 and the sheet 360 of the air duct 358 relative to the supporting boom section 235. By rotating the connecting element 362, the angle of impingement of the air expelled from the air outlets 364 of the connecting element 362 is altered relative to the jet of atomized fluid material expelled from the nozzles 240. The rotational motion may be transmitted between adjacent (end-to-end) connecting elements 362 by means of separate connectors (not shown) which may be inserted in the channel-like section 367.

The nozzles 240 may be rotatably secured to the boom section 235, e.g. for rotation about an axis extending parallel to the boom section 235, the rotation being effected by means of any simple linking system joined to the connecting element 362 for ensuring a coordinated rotation of the nozzles 240 and the connecting element 362.

Figure 11:
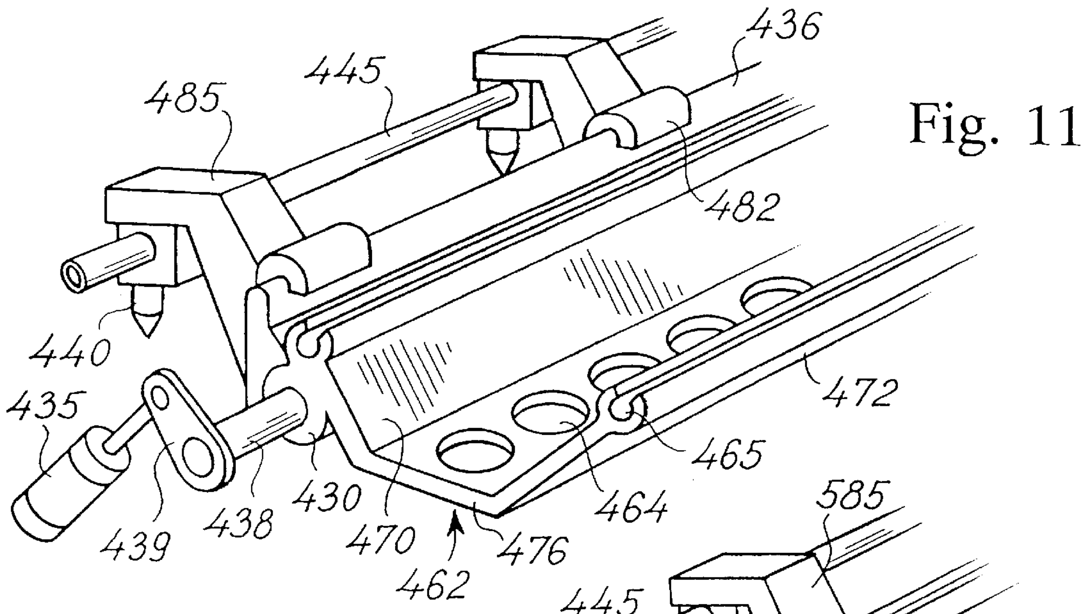
FIG. 11 is a perspective, schematic and sectional view of an alternative embodiment of the boom structure and the profiled element of the inflatable duct of the agriculture sprayer apparatus according to the present invention.

FIG. 11 illustrates in greater details a part of a connecting element 462 which differs from the above described connecting element 362 shown in FIG. 10 by the provision of a through-going flange 436 which is formed as an integral part of the connecting element, and which supports a number of brackets 485 which further support tubings 445 and nozzles 440 similar to the tubings 245 and the nozzles 240 described above with reference to FIGS. 9 and 10. The brackets are provided with a section 482 which engages the flange 436 by snap-action whereby the nozzle-supporting brackets may be secured to the connecting element 462. As shown, the connecting element 462 is provided with a section 430 to which a shaft 438 is connected which shaft 438 together with a crank arm 439 and an actuator 435 correspond to the shafts 138, 338, the crank arms 139 and 339 and the actuators 135 and 335 described above with reference to FIGS. 8 and 10, respectively. Thus, through the operation of the motor 435, the connecting element 462 and the nozzles 440 are pivoted or rotated relative to the supporting boom section (not shown), while being fixed relative to one another.

Figure 12:
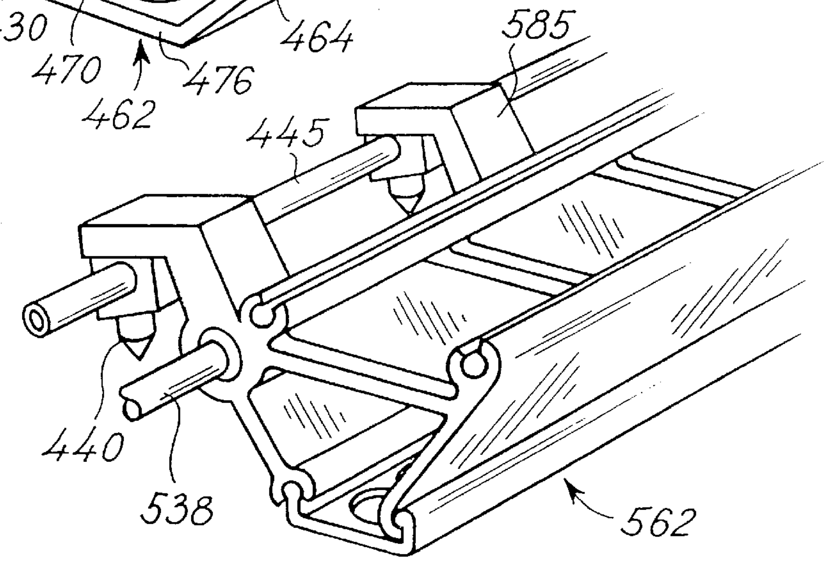
FIG. 12 is a perspective, schematic and sectional view similar to the view of FIG. 11, however including the profile element shown in FIG. 3 of the inflatable duct of the agriculture sprayer apparatus according to the present invention.

In FIG. 12, a connecting element 562 is shown which connecting element is very much similar to the connecting element 162 described above with reference to FIG. 3, however differing from the connecting element 162 in two aspects to be described below.

Thus, the connecting element 562 and the individual elements or components thereof are designated the same reference numerals as the corresponding components of the connecting element 162, however amended by the substitution of the first integer 1 by the integer 5. The connecting element 562 shown in FIG. 12 firstly differs from the above described connecting element 162 in that the element is integrally connected to brackets 585 serving the same purpose as the brackets 485 described above with reference to FIG. 11, viz. the purpose of supporting the tubings 445 and the nozzles 440 described above with reference to FIG. 11. Secondly, the integral structure of the connecting element 162 and the tubings and nozzles support brackets 585 is rotatable round a shaft 538 on which the integral structure is supported relative to the boom structure of the spraying unit 20 allowing the integral structure comprising the connecting element 562 and the nozzles 440 supported by the brackets 585 to be rotated relative to the longitudinal axis of the boom structure.

Figure 13:
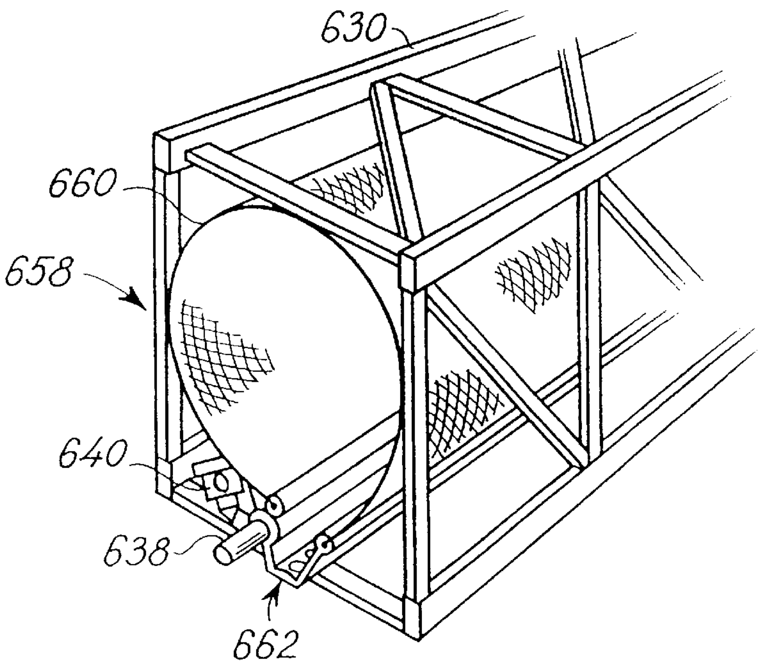
FIG. 13 is a perspective, schematic and sectional view of a boom structure of the agriculture sprayer apparatus according the the present invention constituting a framework supporting and enclosing the inflatable duct and also supporting a set of nozzles of the agriculture sprayer apparatus.

In FIG. 1, the air ducts 58 and 59 are supported by the supported boom structure and extend in inflated state upwardly from the supporting boom structure. In FIG. 13, an alternative embodiment of the air duct is shown designated the reference numeral 658 and differing from the above described air duct 58 shown in FIG. 1 in that the air duct 658 is consealed within the supporting boom structure which is designated the reference numeral 630 which consequently serves the additional purpose of protecting the air duct, which similar to the above described air ducts comprise a sheet 660 apart from supporting the air duct 658. The air duct 658 shown in FIG. 13 comprises a connecting element 662 which is of a structure similar to the structure of the connecting element 62' described above with reference to FIG. 2*b*, however additionally provided with an outwardly protruding shaft 638 serving the purpose of allowing the air duct 658 to be rotated by means of an actuator, such as a motor or a hydraulic or electric cylinder (not shown) relative to the supporting boom structure 630. The actuator serving the purpose of rotating the air duct 658 relative to the supporting boom structure 630 may be implemented in accordance with the techniques described above with reference to FIGS. 8, 10 and 11. In FIG. 13, a nozzle 640 is further shown which is supported by the boom structure 630 and serves the purpose of expelling the atomized spraying agent supplied to the nozzles from the supplied tank of the spraying unit 20.

Figure 14:
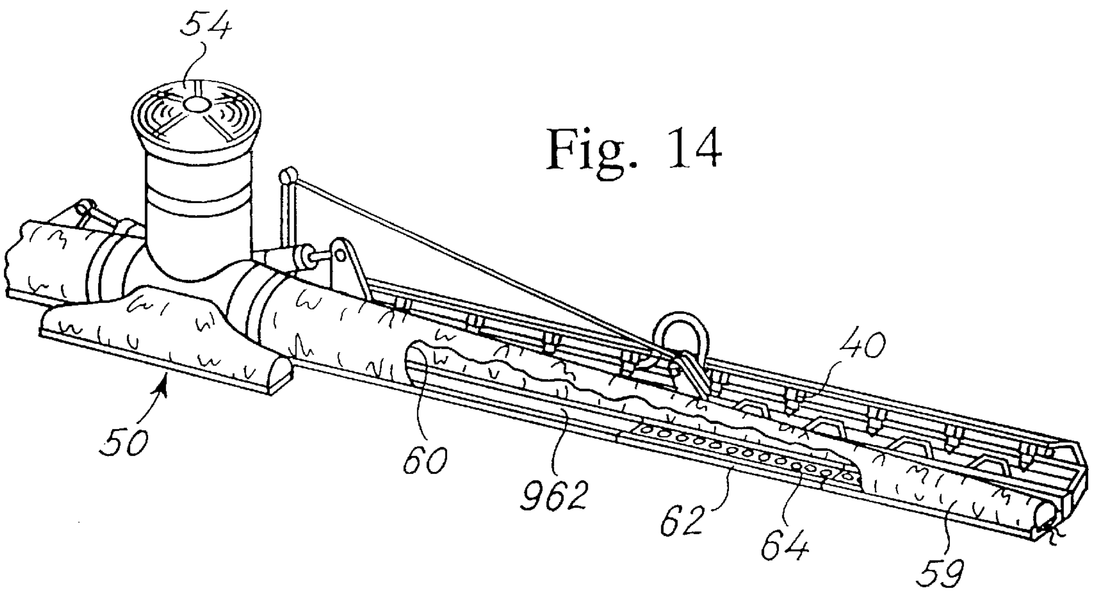
FIG. 14 is a perspective and schematic view of a part of an air distributing device according to an alternative embodiment of the invention.
Figure 15:
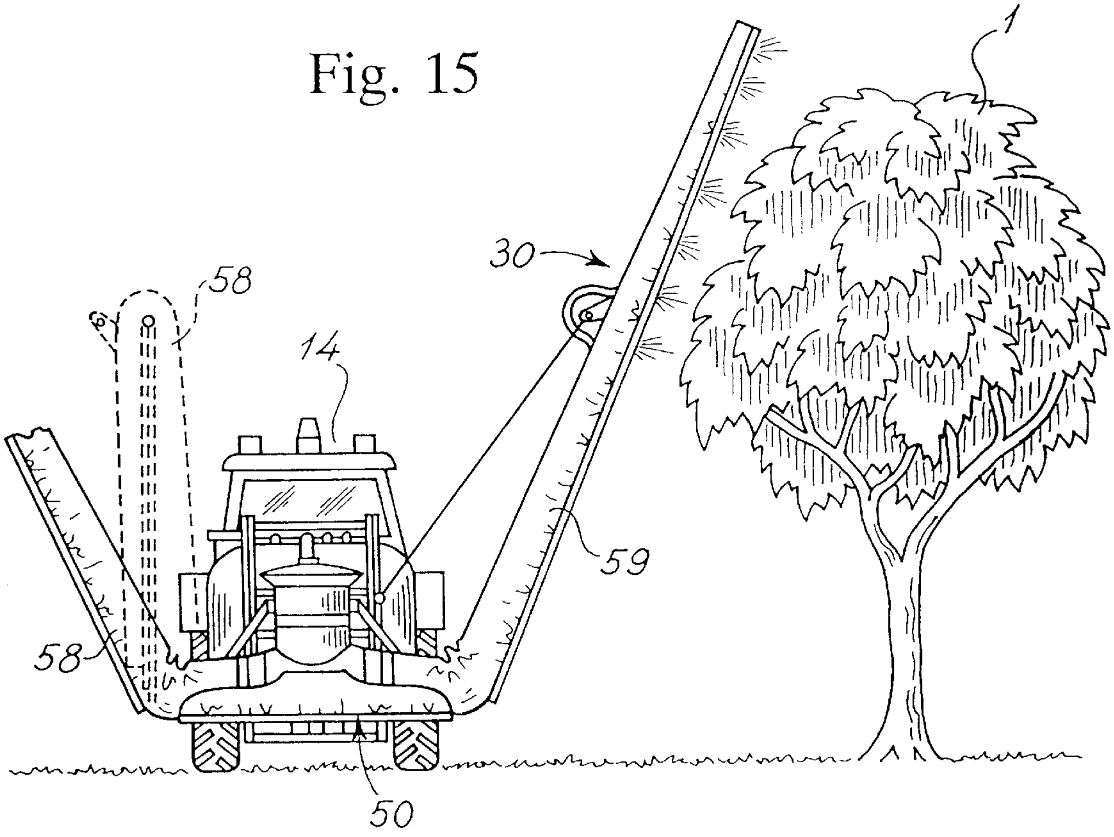
FIG. 15 is a perspective and schematic view of an agricultural sprayer unit according to the present invention, and used for spraying row crops.

FIG. 14 shows by way of example the air duct 59 of the air distribution device 50 being fitted with connecting elements 62 and 962 and ready to use for spraying crops arranged in rows or for spraying areas where no air discharge is desired from the interior part of the air duct 59, i.e. the part of the air duct 59 situated close to the air blower 54. One or several connecting elements 62 may thus be arranged in an end-to-end relationship in the outermost part of the air duct 59 and being provided with apertures 64 allowing the air flowing in the air duct of the air distribution device 50 to be expelled. Socalled blinds or connecting elements 962 having no air outlets are provided extending along a part of the air duct 59 close to the air blower 54, the blinds 962 serving the function of ensuring the integrity of the air duct 59 in this region. This application or arrangement of connecting elements is particularly useful when applying the spraying unit according to the invention in the spraying of trees, as shown in FIG. 15 wherein a spraying unit according to the invention in shown as passing by a tree 1, the boom structure being raised to a position in which the boom structure and the air duct 59 extends at an angle relative to the horizontal on which the spraying unit according to the invention travels. In this case only the outermost part of the air duct 59 and the nozzle means 40 are active, thus ensuring that the spraying agent and the air flow is directed towards the crown or top of the tree 1. For spraying row crops formed by bushes, cucumber plants, the boom structure may alternatively be provided with a plurality of vertical and downwardly extending air ducts comprising the same elements as the air ducts 58, 59 described with reference to FIGS. 1–15 i.e. comprising connecting elements and a flexible sheet and being connected to a separate boom structure.

Although the present invention has been described above with reference to presently preferred embodiments, it is to be understood that numerous modifications are easily deduced by a person having ordinary skill in the art without departing from the scope and spirit of the present invention. These modifications or alternative embodiments are to be considered part of the present invention, as the scope of the present invention is by no means to be construed limited to the above-described embodiments, but rather be considered defined by the scope of the appending claims.

We claim:

1. An agricultural sprayer unit to be moved by a moving vehicle relative to crops to be sprayed with a chemical agent delivered from said agricultural sprayer unit, comprising:

a frame connectable to said moving vehicle for connecting said agricultural sprayer unit to said moving vehicle for moving along with said moving vehicle;

a tank supported by said frame for storing said chemical agent;

a boom linked to and extending from said frame defining a specific orientation relative to said crops, said boom being capable of being oriented, during operation of said agricultural sprayer unit, at an angle to a ground suitable for spraying said crops on trees;

a plurality of nozzles supported by and positioned along said boom and communicating with said tank for receiving said chemical agent from said tank for generating an atomized Jet of said chemical agent to be expelled from said nozzles and sprayed onto said crops;

an air-flow generating and distributing assembly supported by said frame and comprising an elongated air duct extending along said boom for generating and distributing an air flow directed from said air-flow generating and distributing assembly to said crops, said air duct comprising a tube having an elongated slit-like opening and parallel spaced edges defining said slit-like opening, said air-flow generating and distributing assembly being divided into a number of subsections positioned along said boom, each subsection comprising an elongated releasable connecting element each having a set of individual air outlets for generating a specific air distribution pattern by said individual air outlets relative to said atomized jet of said chemical agent, and said specific air distribution patterns generated by said subsections together defining said air flow directed to said crops;

wherein said elongated connecting elements are releasably secured to parallel edges along the length thereof.

2. The agricultural sprayer unit according to claim 1, wherein said air-flow generating and distributing assembly further comprises a specific subsection including no air outlets and generating no air distribution pattern.

3. The agricultural sprayer unit according to claim 1, wherein said frame comprises a connecting device to establish a connection to a three-point suspension of said vehicle.

4. The agricultural sprayer unit according to claim 1, wherein said frame is mounted on a movable trailer, said trailer comprising a connecting device providing a connection to a hitch of said moving vehicle.

5. The agricultural sprayer unit according to claim 1, wherein said frame comprises a lift platform.

6. The agricultural sprayer unit according to claim 5, wherein said boom is supported by said lift platform.

7. The agricultural sprayer unit according to claim 5, wherein an air-flow generating portion of said air-flow generating and distributing assembly is supported by said lift platform.

8. The agricultural sprayer unit according to claim 1, wherein said boom is rotatably linked to said frame.

9. The agricultural sprayer unit according to claim 1, wherein said boom comprises a plurality of boom sections.

10. The agricultural sprayer unit according to claim 9, wherein said boom sections are interconnected by hinges.

11. The agricultural sprayer unit according to claim 9, wherein:

said air duct is divided into subsections corresponding to said boom sections.

12. The agricultural sprayer unit according to claim 11, wherein each subsection of said air duct defines a length corresponding to a length of a respective boom section.

13. The agricultural sprayer unit according to claim 1, wherein said boom extends laterally from each of two sides of said frame.

14. The agricultural sprayer unit according to claim 1, further comprising:

a pump; and a tubing, said pump being connectable to a power take-off of said moving vehicle and delivering said chemical agent contained in said tank through said tubing to said nozzles.

15. The agricultural sprayer unit according to claim 1, wherein said nozzles generate said atomized jet according to a predetermined pattern.

16. The agricultural sprayer unit according to claim 1, wherein said nozzles are positioned along said boom at a spacing of 0.25 m–1.25 m.

17. The agricultural sprayer unit according to claim 16, wherein said nozzles are rotatably supported for rotation about a longitudinal axis of said boom, said nozzles being linked to said air-flow generating and distributing assembly.

18. The agricultural sprayer unit according to claim 1, wherein said air-flow generating and distributing assembly comprises a plurality of individual blower arranged along said boom.

19. The agricultural sprayer unit according to claim 1, wherein said individual air outlets of said subsection of said air generating and distributing assembly have identical configuration.

20. The agricultural sprayer unit according to claim 1, wherein said air-flow generating and distributing assembly comprises an air-blower.

21. An agricultural sprayer unit according to claim 1, wherein a plurality of said elongated connecting elements are arranged in an end to end relationship along the length of said air duct.

22. An agricultural sprayer unit according to claim 1, wherein said elongated connecting elements are releasably connected to said boom.

23. An agricultural sprayer unit according to claim 1, wherein said elongated connecting elements are rotatably and releasably connected to said boom.

24. An agricultural sprayer unit to be moved by a moving vehicle relative to crops to be sprayed with a chemical agent delivered from said agricultural sprayer unit, comprising:

a frame connectable to said moving vehicle for connecting said agricultural sprayer to said moving vehicle for moving along with said moving vehicle;

a tank supported by said frame for storing said chemical agent;

a boom linked to and extending from said frame defining a specific orientation relative to said crops;

a plurality of nozzles supported by and positioned along said boom and communicating with said tank for receiving said chemical agent from said tank for generating an atomized jet of said chemical agent to be expelled from said nozzle and sprayed onto said crops; and air-flow generating and distributing assembly supported by said frame and extending along said boom for generating and distributing an air flow directed from said air-flow generating and distributing assembly being divided into a number of subsections positioned along said boom, each subsection including a set of individual air outlets for generating a specific air distribution pattern by said individual air outlets relative to said atomized jet of said chemical agent, and said specific air distribution patterns generated by said subsections together defining said air flow directed to said crops, wherein said air-flow generating and distributing assembly comprises an air blower and an air duct extending along said boom, and said air duct is inflatable and comprises an elongated, flexible and air-impervious sheet having longitudinally extending edges, said edges being secured in spaced-apart relationship and extending along said boom, said inflatable duct comprising elongated releasable connecting elements extending along said edges of said air-impervious sheet, said longitudinally extending edges being fastened to and interconnected by said elongated connecting elements, and said elongated elements defining said subsections of said air duct.

25. An agricultural sprayer unit to be moved by a moving vehicle relative to crops to be sprayed with a chemical agent delivered from said agricultural sprayer unit, comprising:

a frame connectable to said moving vehicle for connecting said agricultural sprayer to said moving vehicle for moving along with said moving vehicle;

a tank supported by said frame for storing said chemical agent;

a boom linked to and extending from said frame defining a specific orientation relative to said crops;

a plurality of nozzles supported by and positioned along said boom and communicating with said tank for receiving said chemical agent from said tank for generating an atomized jet of said chemical agent to be expelled from said nozzle and sprayed onto said crops; and air-flow generating and distributing assembly supported by said frame and extending along said boom for generating and distributing an air flow directed from said air-flow generating and distributing assembly being divided into a number of subsections positioned along said boom, each subsection including a set of individual air outlets for generating a specific air distribution pattern by said individual air outlets relative to said atomized jet of said chemical agent, and said specific air distribution patterns generated by said subsections together defining said air flow directed to said crops, wherein said air-flow generating and distributing assembly comprises an air blower and an air duct extending along said boom, and said air duct is inflatable and comprises an elongated, flexible and air-impervious sheet having longitudinally extending edges, said edges being secured in spaced-apart relationship and extending along said boom, said inflatable duct comprising elongated releasable connecting elements extending along said edges of said air-impervious sheet, said longitudinally extending edges being fastened to and interconnected by said elongated connecting elements, and said elongated elements comprising separate, releasable air outlet elements defining said subsections of said air duct.

26. The agricultural sprayer unit according to claim 24, wherein said elongated connecting elements are connected to said boom.

27. The agricultural sprayer unit according to claim 24, wherein said elongated connecting elements are rotatably joined to said boom.

28. The agricultural sprayer unit according to claim 24, wherein said elongated connecting elements secure said longitudinally extending edges of said air-impervious sheet in said spaced-apart relationship.

29. The agricultural sprayer unit according to claim 24, wherein said elongated connecting elements are provided with fasteners for securing said longitudinal edges in said spaced-apart relationship.

30. The agricultural sprayer unit according to claim 24, wherein said air-impervious sheet is provided with fasteners arranged along said longitudinally extending edges for securing said edges in said spaced-apart relationship.

31. The agricultural sprayer unit according to claim 30, wherein:

said elongated connecting elements are provided with fasteners for securing said longitudinal edges in said spaced-apart relationship, and said fasteners of said sheet and said fasteners of said elongated connecting elements are complementary.

32. The agricultural sprayer unit according to claim 24, wherein said longitudinally extending edges of said air-impervious sheet are releasably fastened to said connecting elements.

33. The agricultural sprayer unit according to any of the claims 24–32, wherein said elongated connecting elements are arranged end to end.

34. A combination including an air-flow generating and distributing assembly for an agricultural sprayer unit to be moved by a moving vehicle relative to crops to be sprayed with a chemical agent delivered from said agricultural sprayer unit, said agricultural sprayer unit comprising:

a frame connectable to said moving vehicle for connecting said agricultural sprayer unit to said moving vehicle for moving along with said moving vehicle;

a tank supported by said frame for storing said chemical agent;

a boom linked to and extending from said frame defining a specific orientation relative to said crops, said boom being capable of being oriented, during operation of said agricultural sprayer unit, at an angle to a ground suitable for spraying said crops on trees; and a plurality of nozzles supported by and positioned along said boom and communicating with said tank for receiving said chemical agent from said tank for generating an atomized jet of said chemical agent to be expelled from said nozzles and sprayed onto said crops, said air-flow generating and distributing assembly supported by said frame and extending along said boom for generating and distributing an air flow directed from said air-flow generating and distributing assembly to said crops, said air-flow generating and distributing assembly being divided into a number of subsections positioned along said boom, each subsection including an elongated releasable connecting element each having set of individual air outlets for generating a specific air distribution pattern by said individual air outlets relative to said atomized jet of said chemical agent, and said specific air distribution patterns generated by said subsections together defining said air flow directed to said crops.

35. The combination according to claim 34, further comprising a specific subsection including air outlets and generating no air distribution pattern.

36. The combination according to claim 34, further comprising individual air-blowers arranged along said boom.

37. The combination according to claim 34, further comprising an air duct extending along said boom.

38. The combination according to claim 34, further comprising an air duct being divided into sections, said air duct extending along said boom.

39. The combination according to claim 38, wherein said boom comprises a plurality of boom sections, each subsection of said air-flow generating and distributing assembly defining a length corresponding to a length of a respective boom section.

40. The combination according to claim 34, wherein said individual air outlets of said subsections of said air-flow generating and distributing assembly have identical configuration.

41. A combination including an air-flow generating and distributing assembly for an agricultural sprayer unit to be moved by a moving vehicle relative to crops to be sprayed with a chemical agent delivered from said agricultural sprayer unit, comprising:

a frame connectable to said moving vehicle for connecting said agricultural sprayer to said moving vehicle for moving along with said moving vehicle;

a tank supported by said frame for storing said chemical agent;

a boom linked to and extending from said frame defining a specific orientation relative to said crops;

a plurality of nozzles supported by and positioned along said boom and communicating with said tank for receiving said chemical agent from said tank for generating an atomized jet of said chemical agent to be expelled from said nozzles and sprayed onto said crops; and said air-flow generating and distributing assembly supported by said frame and extending along said boom for generating and distributing an air flow directed from said air-flow generating and distributing assembly to said crops, said air-flow generating and distributing assembly being divided into a number of subsections positioned along said boom, each subsection including a set of individual air outlets for generating a specific air distribution pattern by said individual air outlets relative to said atomized jet of said chemical agent, and said specific air distribution patterns generated by said subsections together defining said air flow directed to said crops, wherein said air-flow generating and distributing assembly comprises an air duct extending along said boom, and said air duct is inflatable and comprises an elongated, flexible and air-impervious sheet having longitudinally extending edges, said edges being secured in spaced-apart relationship and extending along said boom of said agricultural sprayer unit, said inflatable duct comprising elongated releasable connecting elements extending along said edges of said air-impervious sheet, said longitudinally extending edges being fastened to and interconnected by said elongated connecting elements, and said elongated elements defining said subsections.

42. The combination according to claim 41, wherein said elongated connecting elements are connected to said boom.

43. The combination according to claim 41, wherein said elongated connecting elements are rotatably joined to said boom.

44. The combination according to claim 41, wherein said elongated connecting elements secure said longitudinally extending edges of said air-impervious sheet in said spaced-apart relationship.

45. The combination according to claim 41, wherein said elongated connecting elements are provided with fasteners for securing said longitudinal edges in said spaced-apart relationship.

46. The combination according to claim 41, wherein said air impervious sheet is provided with fasteners arranged along said longitudinally extending edges for securing said edges in said spaced-apart relationship.

47. The combination according to claim 46, wherein:

said elongated connecting elements are provided with fasteners for securing said longitudinal edges in said spaced-apart relationship, and said fasteners of said sheet and said fasteners of said elongated connecting elements are complementary.

48. The combination according to claim 46, wherein said longitudinally extending edges of said air-impervious sheet are releasably fastened to said connecting elements.

49. The combination according to claim 41, wherein said elongated connecting elements are arranged end to end.

50. A combination including an air-flow generating and distributing assembly for an agricultural sprayer unit to be moved by a moving vehicle relative to crops to be sprayed with a chemical agent delivered from said agricultural sprayer unit, comprising:

a frame connectable to said moving vehicle for connecting said agricultural sprayer to said moving vehicle for moving along with said moving vehicle;

a tank supported by said frame for storing said chemical agent;

a boom linked to and extending from said frame defining a specific orientation relative to said crops;

a plurality of nozzles supported by and positioned along said boom and communicating with said tank for receiving said chemical agent from said tank for generating an atomized jet of said chemical agent to be expelled from said nozzles and sprayed onto said crops; and said air-flow generating and distributing assembly supported by said frame and extending along said boom for generating and distributing an air flow directed from said air-flow generating and distributing assembly to said crops, said air-flow generating and distributing assembly being divided into a number of subsections positioned along said boom, each subsection including a set of individual air outlets for generating a specific air distribution pattern by said individual air outlets relative to said atomized jet of said chemical agent, and said specific air distribution patterns generated by said subsections together defining said air flow directed to said crops, wherein said air-flow generating and distributing assembly comprises an air duct extending along said boom, and said air duct is inflatable and comprises an elongated, flexible and air-impervious sheet having longitudinally extending edges, said edges being secured in spaced-apart relationship and extending along said boom, said inflatable duct comprising elongated releasable connecting elements extending along said edges of said air-impervious sheet, said longitudinally extending edges being fastened to and interconnected by said elongated connecting elements, and said elongated elements comprising separate, releasable air outlets defining said subsections.

51. An agricultural sprayer unit to be moved by a moving vehicle relative to crops to be sprayed with a chemical agent delivered from said agricultural sprayer unit, comprising:

a frame connectable to said moving vehicle for connecting said agricultural sprayer unit to said moving vehicle for moving along With said moving vehicle;

a tank supported by said frame for storing said chemical agent;

a boom linked to and extending from said frame defining a specific orientation relative to said crops;

a plurality of nozzles supported by and positioned along said boom and communicating with said tank for receiving said chemical agent from said tank for generating an atomized jet of said chemical agent to be expelled from said nozzles and sprayed onto said crops; and air-flow generating and distributing assembly supported by said frame and comprising an air-blower and an air duct extending along said boom for generating an air flow directed from said air-flow generating and distributing assembly to said crops, said air duct being inflatable and comprising an elongated, flexible and air-impervious sheet having longitudinally extending edges, said edges being secured in spaced-apart relationship and extending along said boom, said inflatable duct comprising elongated releasable connecting elements extending along said edges of said air-impervious sheet, and said longitudinally extending edges being fastened to and interconnected by said elongated connecting elements.

52. The agricultural sprayer according to claim 51, wherein said air-flow generating and distributing assembly comprises a plurality of individual blowers arranged along said boom.

53. The agricultural sprayer unit according to claim 51, wherein said air-flow generating and distributing assembly further comprises a specific subsection having no air outlets and generating no air-flow directed towards said crops.

54. The agricultural sprayer unit according to claim 51, wherein said frame comprises a connecting device to establish a connection to a three-point suspension of said vehicle.

55. The agricultural sprayer unit according to claim 51, wherein said frame is mounted on a movable trailer, said trailer comprising a connecting device providing a connection to a hitch of said moving vehicle.

56. The agricultural sprayer unit according to claim 51, wherein said frame comprises a lift platform.

57. The agricultural sprayer unit according to claim 56, wherein said boom is supported by said lift platform.

58. The agricultural sprayer unit according to claim 56, wherein an air-flow generating portion of said air-flow generating and distributing assembly is supported by said lift platform.

59. The agricultural sprayer unit according to claim 51, wherein said boom is rotatably linked to said frame.

60. The agricultural sprayer unit according to claim 51, wherein said boom comprises a plurality of boom sections.

61. The agricultural sprayer unit according to claim 60, wherein said boom sections are interconnected by hinges.

62. The agricultural sprayer unit according to claim 60, wherein:

said air duct is divided into subsections corresponding to said boom sections.

63. The agricultural sprayer unit according to claim 62, wherein each subsection of said air duct defines a length corresponding to a length of a respective boom section.

64. The agricultural sprayer unit according to claim 51, wherein said boom extends laterally from each of two sides of said frame.

65. The agricultural sprayer unit according to claim 51, wherein said boom extends substantially horizontally.

66. The agricultural sprayer unit according to claim 51, further comprising:

a pump; and a tubing, said pump being connectable to a power take-off of said moving vehicle and delivering said chemical agent contained in said tank through said tubing to said nozzles.

67. The agricultural sprayer unit according to claim 51, wherein said nozzles generate said atomized jet according to a flat fan pattern.

68. The agricultural sprayer unit according to claim 51, wherein said elongated connecting elements are releasably connected to the boom.

69. The agricultural sprayer unit according to claim 68, wherein said nozzles are rotatably supported for rotation about a longitudinal axis of said boom, said nozzles being linked to said air-flow generating and distributing assembly.

70. An agricultural sprayer unit according to claim 51, wherein said air generating and distributing assembly is divided into a number of subsections positioned along said boom, each subsection including a set of individual air outlets for generating a specific air distribution pattern by said individual air outlets relative to said atomized jet of said chemical agent, and said specific air distribution patterns generated by said subsections together defining said air flow directed to said crops.

71. The agricultural sprayer unit according to claim 70, wherein said elongated connecting elements are connected to said boom.

72. The agricultural sprayer unit according to claim 70, wherein said elongated connecting elements are rotatably joined to said boom.

73. The agricultural sprayer unit according to claim 70, wherein said longitudinally extending edges of said air-impervious sheet are releasably fastened to said connecting elements.

74. The agricultural sprayer unit according to claim 70, wherein said elongated connecting elements are provided with fasteners for securing said longitudinal edges in said spaced-apart relationship.

75. The agricultural sprayer unit according to claim 74, wherein said air-impervious sheet is provided with fasteners arranged along said longitudinally extending edges for securing said edges in said spaced-apart relationship.

76. The agricultural sprayer unit according to claim 75, wherein:

said elongated connecting elements are provided with fasteners for securing said longitudinal edges in said spaced-apart relationship, and said fasteners of said sheet and said fasteners of said elongated connecting elements are complementary.

77. The agricultural sprayer unit according to claim 51, wherein said elongated connecting elements are arranged end to end.

78. The agricultural sprayer unit according to claim 51, wherein said boom is capable of being oriented, during operation of said agricultural sprayer unit, at an angle to a ground suitable for spraying said crops on trees.

79. An agricultural sprayer unit to be moved by a moving vehicle relative to crops to be sprayed with a chemical agent delivered from said agricultural sprayer unit, comprising:

a frame connectable to said moving vehicle for connecting said agricultural sprayer unit to said moving vehicle for moving along with said moving vehicle;

a tank supported by said frame for storing said chemical agent;

a boom linked to and extending from said frame defining a specific orientation relative to said crops;

a plurality of nozzles supported by and positioned along said boom and communicating with said tank for receiving said chemical agent from said tank for generating an atomized jet of said chemical agent to be expelled from said nozzles and sprayed onto said crops; and air-flow generating and distributing assembly supported by said frame and comprising an air-blower and an air duct extending along said boom for generating an air flow directed from said air-flow generating and distributing assembly to said crops, said air duct being inflatable and comprising an elongated, flexible and air-impervious sheet having longitudinally extending edges, said edges being secured in spaced-apart relationship and extending along said boom, said inflatable duct comprising elongated releasable connecting elements extending along said edges of said air-impervious sheet, and said longitudinally extending edges being fastened to and interconnected by said elongated connecting elements, and said elongated connecting elements comprising separate, releasable air outlets.

80. The agricultural sprayer according to claim 79, wherein said air-flow generating and distributing assembly comprises a plurality of individual blowers arranged along said boom.

81. The agricultural sprayer unit according to claim 79, wherein said air-flow generating and distributing assembly further comprises a specific subsection of said elongated connecting elements including no air outlets and generating no air distribution pattern.

82. The agricultural sprayer unit according to claim 79, wherein said frame comprises a connecting device to establish a connection to a three-point suspension of said vehicle.

83. The agricultural sprayer unit according to claim 79, wherein said frame is mounted on a movable trailer, said trailer comprising a connecting device providing a connection to a hitch of said moving vehicle.

84. The agricultural sprayer unit according to claim 79, wherein said frame comprises a lift platform.

85. The agricultural sprayer unit according to claim 84, wherein said boom is supported by said lift platform.

86. The agricultural sprayer unit according to claim 84, wherein an air-flow generating portion of said air-flow generating and distributing assembly is supported by said lift platform.

87. The agricultural sprayer unit according to claim 79, wherein said boom is rotatably linked to said frame.

88. The agricultural sprayer unit according to claim 79, wherein said boom comprises a plurality of boom sections.

89. The agricultural sprayer unit according to claim 88, wherein said boom sections are interconnected by hinges.

90. The agricultural sprayer unit according to claim 88, wherein:

said air duct is divided into subsections corresponding to said boom sections.

91. The agricultural sprayer unit according to claim 90, wherein each subsection of said air duct defines a length corresponding to a length of a respective boom section.

92. The agricultural sprayer unit according to claim 79, wherein said boom extends laterally from each of two sides of said frame.

93. The agricultural sprayer unit according to claim 79, wherein said boom extends substantially horizontally.

94. The agricultural sprayer unit according to claim 79, further comprising:

a pump; and a tubing, said pump being connectable to a power take-off of said moving vehicle and delivering said chemical agent contained in said tank through said tubing to said nozzles.

95. The agricultural sprayer unit according to claim 79, wherein said nozzles generate said atomized jet according to a flat fan pattern.

96. The agricultural sprayer unit according to claim 79, wherein said elongated connecting elements are releasably connected to the boom.

97. The agricultural sprayer unit according to claim 96, wherein said nozzles are rotatably supported for rotation about a longitudinal axis of said boom, said nozzles being linked to said air-flow generating and distributing assembly.

98. The agricultural sprayer unit according to claim 79, wherein said separate, releasable air outlets of said air generating and distributing assembly have identical configuration.

99. The agricultural sprayer unit according to claim 79, wherein said elongated connecting elements are arranged end to end.

100. The agricultural sprayer unit according to claim 79, wherein said boom is capable of being oriented, during operation of said agricultural sprayer unit, at an angle to a ground suitable for spraying said crops on trees.

101. An agricultural sprayer unit according to claim 79, wherein said air generating and distributing assembly is divided into a number of subsections positioned along said boom, each subsection including said elongated connecting elements comprising said separate, releasable air outlets for generating a specific air distribution pattern by said air outlets relative to said atomized jet of said chemical agent, and said specific air distribution patterns generated by said subsections together defining said air flow directed to said crops.

102. The agricultural sprayer unit according to claim 101, wherein said elongated connecting elements are connected to said boom.

103. The agricultural sprayer unit according to claim 101, wherein said elongated connecting elements are rotatably joined to said boom.

104. The agricultural sprayer unit according to claim 101, wherein said elongated connecting elements are provided with fasteners for securing said longitudinal edges in said spaced-apart relationship.

105. The agricultural sprayer unit according to claim 101, wherein said air-impervious sheet is provided with fasteners arranged along said longitudinally extending edges for securing said edges in said spaced-apart relationship.

106. The agricultural sprayer unit according to claim 105, wherein:

said elongated connecting elements are provided with fasteners for securing said longitudinal edges in said spaced-apart relationship, and said fasteners of said sheet and said fasteners of said elongated connecting elements are complementary.

107. The agricultural sprayer unit according to claim 101, wherein said longitudinally extending edges of said air-impervious sheet are releasably fastened to said connecting elements.

108. An agricultural sprayer unit to be moved by a moving vehicle relative to crops to be sprayed with a chemical agent delivered from said agricultural sprayer unit, comprising:

a frame connectable to said moving vehicle for connecting said agricultural sprayer unit to said moving vehicle for moving along with said moving vehicle;

a tank supported by said frame for storing said chemical agent;

a boom linked to and extending from said frame defining a specific orientation relative to said crops, said boom being capable of being oriented, during operation of said agricultural sprayer unit, at an angle to a ground suitable for spraying said crops on trees;

a plurality of nozzles supported by and positioned along said boom and communicating with said tank for receiving said chemical agent from said tank and generating an atomized jet of said chemical agent to be expelled from said nozzles and sprayed onto said crops;

an air-flow generating and distributing assembly supported by said frame and extending along said boom for generating and distributing an air flow directed from said air-flow generating and distributing assembly to said crops, said air-flow generating and distributing assembly being divided into a number of subsections positioned along said boom, each subsection including a set of individual air outlets for generating a specific air distribution pattern by said individual air outlets relative to said atomized jet of said chemical agent, and said specific air distribution patterns generated by said subsections together defining said air flow directed to said crops, a pump; and a tubing, said pump being connectable to a power take-off of said moving vehicle and delivering said chemical agent contained in said tank through said tubing to said nozzles, wherein:

said air-flow generating and distributing assembly further comprises a specific subsection including no air outlets and generating no air distribution pattern, said frame comprises a connecting device to establish a connection to a three-point suspension of said vehicle, said frame comprises a lift platform, said boom is supported by said lift platform, said boom is rotatably linked to said frame, said boom comprises a plurality of boom sections, said boom sections are interconnected by hinges, said nozzles generate said atomized jet according to a predetermined pattern, said nozzles are positioned along said boom at a spacing of 0.25 m–1.25 m, said nozzles are rotatably supported for rotation about a longitudinal axis of said boom, said nozzles being linked to said air-flow generating and distributing assembly, an air-flow generating portion of said air-flow generating and distributing assembly is supported by said lift platform, said air-flow generating and distributing assembly comprises a plurality of individual blowers and an air duct extending along said boom, said air duct is divided into subsections corresponding to said boom sections, each subsection of said air duct defines a length corresponding to a length of a respective boom section, said individual air outlets of said subsection of said air generating and distributing assembly have identical configuration, said air duct is inflatable and comprises an elongated, flexible and air-impervious sheet having longitudinally extending edges, said edges being secured in spaced-apart relationship and extending along said boom, said inflatable duct comprising elongated releasable connecting elements extending along said edges of said air-impervious sheet, said longitudinally extending edges being fastened to and interconnected by said elongated connecting elements, and said elongated connecting elements defining said subsections of said air duct, said elongated connecting elements comprising separate, releasable air outlet elements defining said subsections of said air duct, said elongated connecting elements are rotatably joined to said boom, said elongated connecting elements secure said longitudinally extending edges of said air-impervious sheet in said spaced-apart relationship, said elongated connecting elements are provided with fasteners for securing said longitudinal edges in said spaced-apart relationship, said air-impervious sheet is provided with fasteners arranged along said longitudinally extending edges for securing said edges in said spaced-apart relationship, said fasteners of said sheet and said fasteners of said elongated connecting elements are complementary, said longitudinally extending edges of said air-impervious sheet are releasably fastened to said elongated connecting elements, and said elongated connecting elements are arranged end to end.

* * * * *